US008212793B2

(12) United States Patent
Ishiguro

(10) Patent No.: US 8,212,793 B2
(45) Date of Patent: Jul. 3, 2012

(54) LIQUID CRYSTAL DEVICE, IMAGE SENSOR, AND ELECTRONIC APPARATUS

(75) Inventor: Hideto Ishiguro, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 784 days.

(21) Appl. No.: 12/047,508

(22) Filed: Mar. 13, 2008

(65) Prior Publication Data

US 2008/0246708 A1    Oct. 9, 2008

(30) Foreign Application Priority Data

Apr. 5, 2007    (JP) .................................. 2007-099095

(51) Int. Cl.
*G06F 3/042*    (2006.01)
*G06F 3/038*    (2006.01)
*G09G 5/00*    (2006.01)
*G06K 11/06*    (2006.01)

(52) U.S. Cl. .......... 345/175; 345/207; 345/90; 345/173; 345/104; 178/18.01; 178/18.09; 178/18.11

(58) Field of Classification Search .......... 345/204–207, 345/87–104; 250/200, 553; 178/18.01, 18.09, 178/18.11
See application file for complete search history.

(56) References Cited

U.S. PATENT DOCUMENTS

| 7,009,663 | B2 * | 3/2006 | Abileah et al. .................. 349/12 |
| 7,158,129 | B2 * | 1/2007 | Nakajima ...................... 345/207 |
| 2003/0025863 | A1 * | 2/2003 | Iijima ........................... 349/122 |

FOREIGN PATENT DOCUMENTS

| JP | 07273956 A | * 10/1995 |
| JP | A 7-273956 | 10/1995 |
| JP | A-2003-330013 | 11/2003 |

OTHER PUBLICATIONS

H. Nakamura et al., "Touch Panel Function Integrated LCD Using LTPS Technology," *IDW/AD*, 2005, pp. 1003-1006.

* cited by examiner

*Primary Examiner* — Bipin Shalwala
*Assistant Examiner* — Ilana Spar
(74) *Attorney, Agent, or Firm* — Oliff & Berridge, PLC

(57) ABSTRACT

The invention provides a liquid crystal device including: a first substrate; a second substrate that is provided over the first substrate in such a manner that the first substrate and the second substrate face each other; a plurality of optical sensing sections that is formed in an image display area over the first substrate; and a plurality of light-amount adjusting sections that is formed in the image display area in such a manner that each of the plurality of light-amount adjusting sections includes a liquid crystal portion that overlaps the corresponding optical sensing section in a plan view, constituting a part of a liquid crystal layer that is sandwiched between the first substrate and the second substrate, the plurality of light-amount adjusting sections being capable of adjusting, independently of one another, the amount of incident light that enters the plurality of optical sensing sections through an image display surface that lies at one of two surfaces of the second substrate that does not face the liquid crystal layer, the image display surface being pointed to by a pointing means.

7 Claims, 19 Drawing Sheets

IMAGE OF POINTING OBJECT (FINGER) ACQUIRED AS SHADE

IMAGE OF POINTING OBJECT (FINGER) ACQUIRED AS A RESULT OF DETECTION OF LIGHT REFLECTED BY POINTING OBJECT (FINGER)

IMAGE OF SHADED POINTING OBJECT (FINGER) OVERLAPPING NOISE SHADE (BLACK IMAGE REGION), MAKING DISCRIMINATION THEREBETWEEN IMPOSSIBLE

IMAGE OF UNSHADED POINTING OBJECT (FINGER) OVERLAPPING WHITE IMAGE REGION, MAKING DISCRIMINATION THEREBETWEEN IMPOSSIBLE

FIG. 14A
IMAGE OF SHADED POINTING OBJECT (FINGER) OVERLAPPING NOISE SHADE (BLACK IMAGE REGION), WHICH CAN BE DISCRIMINATED FROM EACH OTHER AFTER INCIDENT-LIGHT AMOUNT ADJUSTMENT CORRECTION PROCESSING ACCORDING TO EXEMPLARY EMBODIMENT OF THE INVENTION

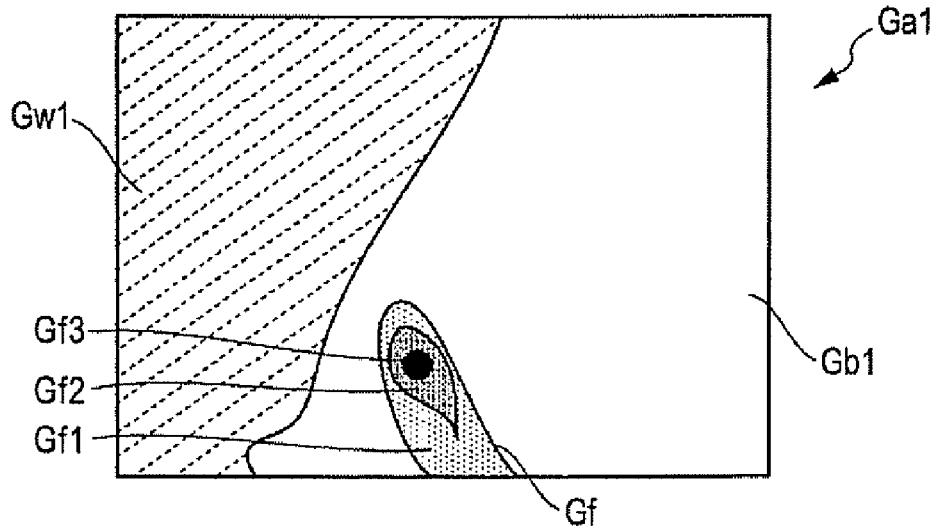

FIG. 14B
IMAGE OF UNSHADED POINTING OBJECT (FINGER) OVERLAPPING WHITE IMAGE REGION, WHICH CAN BE DISCRIMINATED FROM EACH OTHER AFTER INCIDENT-LIGHT AMOUNT ADJUSTMENT CORRECTION PROCESSING ACCORDING TO EXEMPLARY EMBODIMENT OF THE INVENTION

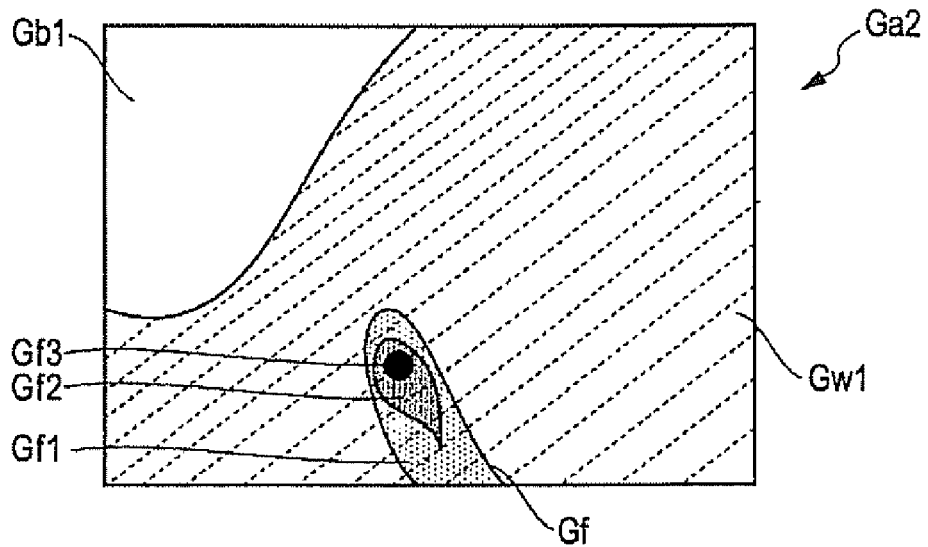

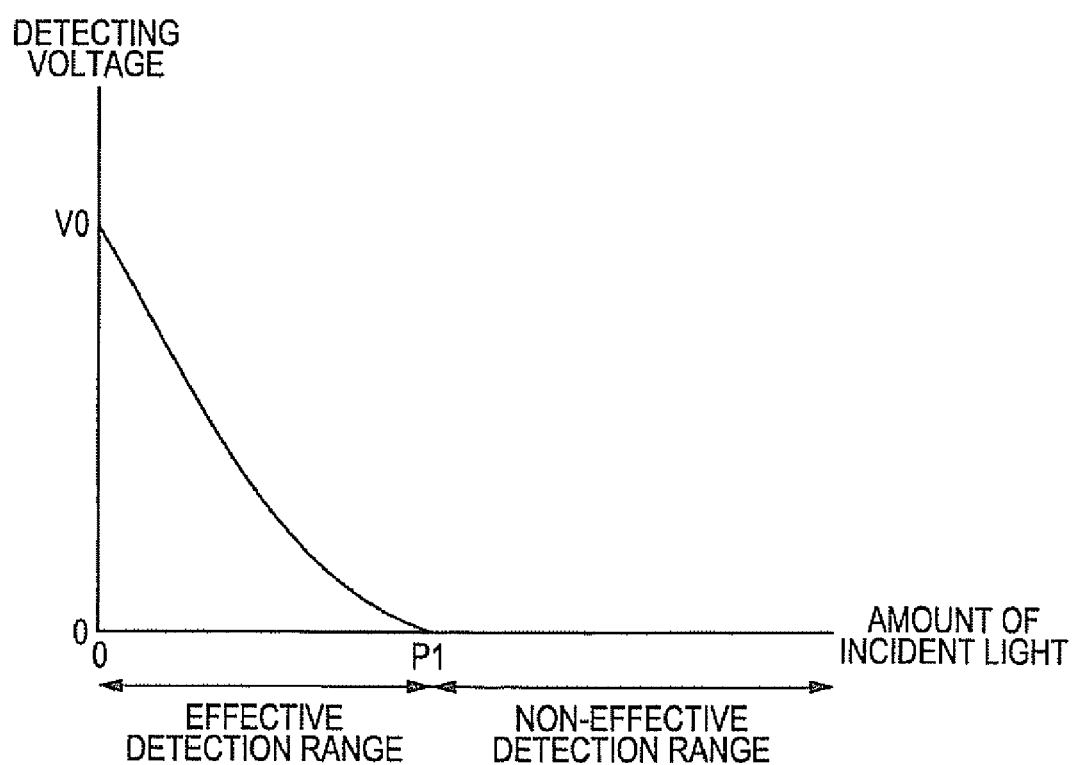

LIQUID CRYSTAL DEVICE, IMAGE SENSOR, AND ELECTRONIC APPARATUS

BACKGROUND

1. Technical Field

The present invention generally relates to a display device having an input sensing function such as a touch-panel-type liquid crystal device. In particular, the invention relates to a liquid crystal device that has a touch panel function that allows a user to input a variety of kinds of information by using a pointing means as an inputting object. Specifically, a liquid crystal device that has a touch panel function to which the invention relates is capable of detecting a pointing means such as a finger of a user, though not limited thereto, which points to an image display surface thereof on which an image is displayed, thereby allowing the user to input a variety of kinds of information by using the pointing means as an inputting object. In addition, the invention further relates to an electronic apparatus that is provided with such a liquid crystal device. Moreover, the invention further relates to an image sensor that realizes such detection.

2. Related Art

In the technical field to which the present invention pertains, a variety of display devices having a so-called touch panel input function has been proposed so far. In the configuration of a touch-panel-type liquid crystal device, which is an example of such a display device having a touch panel input function, an optical sensor (i.e., light sensor, photo sensor) is provided for either each of a plurality of pixel units or each of a plurality of groups of pixel units, where each group thereof is made up of a given number of pixel units. With such a configuration, in addition to its basic function of displaying an image by using light that transmits through the pixel units, a liquid crystal device having a touch panel function of the related art allows a user to input information by means of a pointing means such as a finger of a user, though not limited thereto (In the following description, the pointing means may be referred to as a "pointing object" with no intention to limit the technical scope of the invention as long as the context allows). The liquid crystal device having a touch panel function of the related art allows a user to input information through the functioning of photo detectors, which are light-sensitive pickup elements. Specifically, the photo detectors such as optical sensors detect either the touching of a variety of pointing objects such as a finger of a user or other pointing member, though not limited thereto, onto the display surface of the liquid crystal device or the moving of such a pointing object over the display surface of the liquid crystal device. By this means, the user can input information into the liquid crystal device. For example, a non-patent document of "Touch Panel Function Integrated LCD Using LTPS Technology", N. Nakamura et al., IDW/AD'05 p. 1003-1006 discloses a liquid crystal device that is capable of displaying images under the operation of a driving circuit that is made up of thin film transistors (TFT) containing low-temperature polysilicon (LTPS); the liquid crystal device that is described in the above-identified non-patent document has a touch panel function that enables various kinds of information to be inputted therein on the basis of the image of a pointing object that is detected by an optical sensor provided in each pixel.

In the circuit configuration of an optical sensor that is mounted on such a touch-panel-type liquid crystal device of the related art, for example, a photodiode and a capacitor (i.e., capacitance) are electrically connected to each other. Electric charge that has been accumulated in the capacitor is discharged in response to a photocurrent that is generated in a photodiode that has received incident light. Then, on the basis of electric potential (i.e., voltage) that changes due to the discharging of electric charge, the gradation level of an image is identified. Specifically, for example, one group of optical sensors that is arrayed in a "pointing-means-overlapping" region of an image display area in which images are displayed (i.e., one group of optical sensors that is provided in a partial region thereof at which the pointing means overlap), which can be paraphrased as one group of optical sensors that is provided in a partial region thereof on which the shade of the pointing means is projected, detects the amount of incident light that corresponds to the shade of the pointing means. On the other hand, the other group of optical sensors that is arrayed in the remaining region thereof at which the pointing means does not overlap detects the amount of incident light while taking external light that is not shut off by the pointing means as incident light. Since the amount of the incident light that is detected by the former group of optical sensors, which is arrayed in the partial region of the image display area at which the pointing means overlap, differs from the amount of the incident light that is detected by the latter group of optical sensors, which is arrayed in the remaining region of the image display area at which the pointing means does not overlap, a touch-panel-type liquid crystal device of the related art acquires an image having a difference in its gradation level for each image region on the basis of the difference in the amount of light therebetween. Therefore, in the configuration of such a liquid crystal device having a touch panel function of the related art, a plurality of the optical sensor detects the amount of incident light that enters through the display surface where images are displayed. Then, the touch-panel-type liquid crystal device of the related art acquires an image having image portions (i.e., regions) whose gradation levels are determined on the basis of the amount of incident light that is detected by each of the plurality of the optical sensors, thereby making it possible to identify the location of a pointing means.

The effective detection range of the optical sensor that is mounted in the touch-panel-type liquid crystal device of the related art within which the optical sensor can detect the amount of incident light, or in other words, a range of the amount of incident light within which it can generate a photocurrent that is in accordance with the amount of the incident light is specified as the design value thereof. Therefore, if the optical sensor receives incident light that has a greater light-amount value that goes beyond the effective detection range thereof, a photocurrent that is generated in accordance with the amount of incident light saturates. As a result of such saturation, a voltage change that is supposed to occur on the basis of the photocurrent does not actually occur. Therefore, in such a case, it is not possible to discriminate the target-image region of a pointing means from other non-target-image region.

In addition, if other object, which is not the pointing means, overlaps the pointing means over the display surface of the touch-panel-type liquid crystal device of the related art, it is not possible to discriminate the shade of the pointing object and the shade of the other portion from each other.

If the target image is formed only in either one of a white image region (i.e., a bright image portion having a high gradation level) and a black image region (i.e., a dark image portion having a low gradation level) in accordance with the amount of incident light that is received by each of the plurality of optical sensors, which is a hypothetical case, it is conceivable to adjust the gradation levels of the acquired image in such a manner that the target-image region of the pointing means can be discriminated from the other non-target-image region, which is achieved by uniformly adjusting the amount of incident light that enters each of the plurality of optical sensors arrayed in the display area so as to ensure that the amount of incident light detected by the optical sensors falls within the effective detection range.

The touch-panel-type liquid crystal device of the related art has, as its typical constituent elements, two polarizing plates that sandwich liquid crystal and a pair of substrates thereof. JP-A-2003-330013 discloses a liquid crystal device that is provided with substrates having built-in polarizing plates.

The touch-panel-type liquid crystal device of the related art has not provided an effective technical solution to the problem of difficulty in the identification of the location of a pointing means under unfavorable ambient conditions. Specifically, in a case where an image containing a white image portion and a black image portion is acquired due to reasons attributable to the ambient conditions of a pointing means such as the optical intensity of external light or the presence of other portion that overlaps the pointing means, that is, a noise, it is difficult to make a predetermination as to whether the target-image region corresponding to the pointing means is contained in the white image portion or the black image portion. In such a case, it is difficult to identify the location of the pointing means.

If the image data of an acquired image that contains the target-image portion of a pointing means has a gradation level that is sufficient for detecting the target-image portion of the pointing means, it is possible to discriminate the target-image region of the pointing means from other non-target-image region by performing various kinds of arithmetic processing on such image data. However, if incident light detected by the optical sensor has a light-amount value that does not fall within the effective detection range of the optical sensor, it is not possible to even acquire image data itself containing gradation data that allows the target-image portion of the pointing means to be identified through computation processing.

Similar to the typical configuration of an image pickup apparatus such as a camera that has a mechanical incident-light amount/intensity/level reduction structure (e.g., mechanical iris) and a shutter mechanism that is provided in the optical propagation path thereof, it is conceivable to provide an iris mechanism and a shutter mechanism in each of the optical sensors of the touch-panel-type liquid crystal device of the related art. However, it is practically impossible or at best difficult to secure a space for providing such an iris mechanism and a shutter mechanism at the light-reception side in each of the optical sensors along the optical propagation path of incident light. Among other reasons, in the configuration of the touch-panel-type liquid crystal device of the related art, because it is necessary to provide optical sensors in the image display area thereof, it is practically impossible or at best difficult to secure a space for providing such an iris mechanism and a shutter mechanism at the light-reception side in each of the optical sensors along the optical propagation path of incident light without sacrificing the display performance thereof. Specifically, it is practically impossible or at best difficult to secure such a space without narrowing open regions through which display light that actually contributes to image display can be transmitted.

In addition, similar to the above-described technical problem of a liquid crystal device having a touch panel function of the related art, an image sensor of the related art that picks up (i.e., acquires, captures, or detects) an image of a detection target object has not yet addressed the technical problem of difficulty in discriminating the image region of the detection target object from other region.

SUMMARY

An advantage of some aspects of the invention is to provide a liquid crystal device having a touch panel function that allows a user to input a variety of kinds of information by using a pointing means as an inputting object; or more specifically, the liquid crystal device according to some aspects of the invention is capable of accurately identifying the location of a pointing means such as a finger of a user, though not limited thereto, which points to an image display surface thereof on which an image is displayed, thereby allowing the user to input a variety of kinds of information with a high precision by using the pointing means as an inputting object. In addition, the invention further provides, as an advantage of some aspects thereof, an electronic apparatus that is provided with such a liquid crystal device. Moreover, the invention further provides, as an advantage of some aspects thereof, an image sensor that is capable of acquiring an image in which the image region of a detection target object can be identified from other region with a precise discrimination therebetween.

In order to address the above-identified problem without any limitation thereto, the invention provides, as a first aspect thereof, a liquid crystal device including: a first substrate; a second substrate that is provided over the first substrate in such a manner that the first substrate and the second substrate face each other; a plurality of optical sensing sections that is formed in an image display area over the first substrate; and a plurality of light-amount adjusting sections that is formed in the image display area in such a manner that each of the plurality of light-amount adjusting sections includes a liquid crystal portion that overlaps the corresponding optical sensing section in a plan view, constituting a part of a liquid crystal layer that is sandwiched between the first substrate and the second substrate, the plurality of light-amount adjusting sections being capable of adjusting, independently of one another, the amount of incident light that enters the plurality of optical sensing sections through an image display surface that lies at one of two surfaces of the second substrate that does not face the liquid crystal layer, the image display surface being pointed to by a pointing means.

In such a configuration of a liquid crystal device according to the first aspect of the invention described above, the first substrate is configured as, for example, a TFT array substrate over which semiconductor elements such as TFT (thin film transistors) or the like including a semiconductor layer such as a low-temperature polysilicon layer or the like are formed, without any intention of limitation thereto, whereas the second substrate is configured as, for example, a counter substrate that is provided in such a manner that the TFT array substrate and the counter substrate face each other with a liquid crystal layer being interposed therebetween, which constitutes a non-limiting example of the configuration thereof. Each of the plurality of optical sensing sections includes a light-sensitive pickup element, which is a photo-detection device such as a PIN diode, though not limited thereto. These optical sensing sections are formed in the image display area that is made up of a plurality of pixel units (i.e., pixels) formed over the first substrate.

The plurality of light-amount adjusting sections is formed in the image display area in such a manner that each of the plurality of light-amount adjusting sections includes a liquid crystal portion that overlaps the corresponding optical sensing section in a plan view, constituting a part of a liquid crystal layer that is sandwiched between the first substrate and the second substrate. The plurality of light-amount adjusting sections is capable of adjusting, independently of one another, the amount of incident light that enters the plurality of optical sensing sections through an image display surface that lies at one of two surfaces of the second substrate that does not face the liquid crystal layer, where the image display surface is pointed to by a pointing means.

Specifically, the alignment state, that is, orientation state, of the liquid crystal (molecule) portion of each liquid crystal element (light-amount adjusting section) that overlaps the corresponding optical sensing section in a plan view is controlled. As a result thereof, the amount of incident light that enters the liquid crystal portion thereof is optically modulated. By this means, the amount of incident light that enters the optical sensing section, which has been subjected to the optical modulation, is adjusted. Herein, the term "light amount (i.e., "amount of (incident) light")" refers to the aggregate optical energy of incident light, which is determined on the basis of, as a first factor thereof, the optical intensity of the incident light, and further on the basis of, as a second factor thereof, the duration of incident-light irradiation. For example, this term signifies a physical quantity that is an equivalent of a light-exposure amount that is used in the technical field of an image pickup apparatus such as a camera, though not limited thereto.

The plurality of light-amount adjusting sections is capable of operating independently of one another so as to adjust the amount of incident light that enters each of the plurality of the optical sensing sections. Therefore, even in a case where the amount of incident light that enters through the image display surface in each of a plurality of (pixel) regions that makes up the image display area does not fall, if not corrected, within a detectable range in which each of the optical sensing sections can detect the light amount thereof, the plurality of light-amount adjusting sections according to the first aspect of the invention makes it possible to adjust the amount of incident light that actually enters each of the optical sensing sections so as to ensure that it falls within the detectable range after the adjustment thereof, where such light-amount adjustment is applied either to each optical sensing section, that is, individually on a sensor-by-sensor basis, or to each group of the optical sensing sections; herein, each group thereof is made up of a given number of the optical sensing sections. In particular, in each of the plurality of (pixel) regions that makes up the image display area, in a case where it is not possible to discriminate a pointing means such as a finger of a user, though not limited thereto, from the background thereof because of a change in any ambient condition factor (s) such as external light that is shut off by the pointing means, or more specifically, for example, in a case where the amount of the incident light that enters through an image region of the image display surface on which the shade of the pointing means is projected and the amount of the incident light that enters through a background region of the image display surface that surrounds the image region thereof do not fall within a detectable range in which the light-sensitive pickup element of the optical sensing section can detect the light amount thereof because, for example, the optical intensity of external light is too large, which is a non-limiting reason, each of the plurality of light-amount adjusting sections according to the first aspect of the invention adjusts the light amount thereof so as to ensure that the amount of the incident light that enters through the image region of the image display surface on which the shade of the pointing means is projected and the amount of the incident light that enters through the background region of the image display surface that surrounds the image region thereof are shifted and thus, after the adjustment, fall within the detectable range in which the light-sensitive pickup element of the optical sensing section can detect the light amount thereof. That is, each of the plurality of light-amount adjusting sections according to the first aspect of the invention functions as an incident-light amount/intensity/level reduction layer structure that adjusts the amount of incident light that enters each of the optical sensing sections on an individual basis so that it varies from one (group of) light-amount adjusting section(s) to another (group of) light-amount adjusting section(s).

Therefore, with the configuration of the liquid crystal device according to the first aspect of the invention described above, even in a case where the amount of incident light, which enters through the image display surface in each of a plurality of pixel regions that makes up the image display area, does not fall, if not corrected, within a detectable range in which each of the optical sensing sections can detect the light amount thereof, the plurality of light-amount adjusting sections makes it possible to adjust the amount of incident light that actually enters each of the optical sensing sections so as to ensure that it falls within the detectable range after the adjustment thereof. Accordingly, the liquid crystal device according to the first aspect of the invention described above makes it possible to detect (i.e., identify) a pointing means that could not be detected (i.e. r identified) if the incident light, which enters through the image display surface, reached the optical sensing section without being subjected to the light-amount adjustment performed by the light-amount adjusting section. Thus, the liquid crystal device according to the first aspect of the invention makes it possible to identify the location of the pointing means on (or over) the image display surface in each of a plurality of pixel regions that makes up the image display area thereof. In addition, each of the plurality of light-amount adjusting section functions as an incident-light reduction layer structure that adjusts the amount of incident light that enters each of the optical sensing sections on an individual basis so that it varies from one (group of) light-amount adjusting section(s) to another (group of) light-amount adjusting section(s). Therefore, even under an ambient condition in which the optical intensities of the incident light that includes external light vary from one (pixel) region to another in the image display area, the liquid crystal device according to the first aspect of the invention makes it possible to selectively adjust the amount of incident light in not all but some of (pixel) regions at which the amount of the incident light, which enters through the image display surface, does not fall, if not corrected, within the detectable range in which the corresponding optical sensing sections can detect the light amount thereof. Such an area-selective application of the light-amount adjustment according to the first aspect of the invention ensures an enhanced precision in the detection (i.e., identification of the location) of a pointing means.

In the configuration of the liquid crystal device according to the first aspect of the invention described above, the light-amount adjusting section adjusts the amount of incident light by controlling the alignment state (i.e., orientation state) of the liquid crystal portion of each liquid crystal element thereof that overlaps the corresponding optical sensing section in a plan view, which constitutes a part of a liquid crystal layer through which light for image display is modulated. Therefore, unlike an image pickup apparatus such as a camera that has a mechanical incident-light amount/intensity/level reduction structure (e.g., mechanical iris) that is provided in the optical path thereof, the liquid crystal device according to the first aspect of the invention described above can adjust the amount of the incident light by utilizing a part of the liquid crystal layer thereof, which has a main function of image display. Thus, the liquid crystal device according to the first aspect of the invention makes it possible to adjust the amount of the incident light without requiring any dedicated space for such a mechanical incident-light amount/intensity/level reduction structure. Since the liquid crystal device according to the first aspect of the invention can adjust the amount of the incident light effectively with such an advantageous configuration, it is possible to ensure an enhanced precision in the detection of a pointing means.

It is preferable that the liquid crystal device according to the first aspect of the invention described above should further include a controlling section that commands, in a case where it is not possible to discriminate a target-image region of the pointing means from other non-target-image region, and thus, in a case where it is not possible to identify the pointing means in an acquired image, which is obtained as a result of the detection of incident light performed by each of the plurality of the optical sensing sections, one group of the light-amount adjusting sections that corresponds to a white image region contained in the acquired image to increase an incident-light reduction amount, whereas the controlling section commands the other group of the light-amount adjusting sections that corresponds to a black image region contained in the acquired image to decrease the incident-light reduction amount, thereby controlling the plurality of light-amount adjusting sections independently of one another.

In the preferred configuration described above, the phrase "in a case where it is not possible to discriminate a target-image region of the pointing means from other non-target-image region, and thus, in a case where it is not possible to identify the pointing means in an acquired image" refers to a situation where the amount of the incident light that enters through an image region of the image display surface on which the shade of the pointing means is projected and the amount of the incident light that enters through a background region of the image display surface that surrounds the image region thereof do not fall within a detectable range in which the optical sensing section can detect the light amount thereof; and as a result thereof, there is not a sufficient difference between the gradation level of the image region of the image display surface on which the shade of the pointing means is projected and the gradation level of the background region of the image display surface that surrounds the image region thereof, thereby making it practically impossible to discriminate the target-image region of the pointing means from other non-target-image region. The term "white image portion" (i.e., white image region) means one part of the entire region of an acquired image, which is obtained as a result of the detection of incident light performed by each of the plurality of the optical sensing sections, where the above-mentioned one part of the entire region thereof has a gradation level that is relatively high in comparison with that of a "black image portion" (the definition of which is explained in the next sentence), that is, one image portion thereof that has a relatively high brightness level when an image is displayed than that of the other image portion thereof. On the other hand, the term "black image portion" (i.e., black image region) means the other part of the entire region of the acquired image that has a gradation level that is relatively low in comparison with that of the white image portion thereof, that is, the above-mentioned other image portion thereof that has a relatively low brightness level when an image is displayed than that of the above-mentioned one image portion thereof.

In the typical operation of a liquid crystal device of the related art, if a set of the shape of the white image portion of an acquired image and the shape of the black image portion thereof differs from the shape of a pointing means such as a finger of a user, though not limited thereto, it is difficult to identify a target-image region that indicates the shade of the pointing means in the acquired image. In addition, in a case where an image containing a white image portion and a black image portion is acquired due to reasons attributable to the ambient conditions of a pointing means, it is difficult to make a predetermination as to whether the target-image region corresponding to the pointing means is contained in the white image portion or the black image portion prior to the identification of the target-image region that indicates the shade of the pointing means in the acquired image.

In order to provide a technical solution thereto, in the preferred configuration described above, the controlling section commands one group of the light-amount adjusting sections that corresponds to a white image region contained in the acquired image to increase an incident-light reduction amount, whereas the controlling section commands the other group of the light-amount adjusting sections that corresponds to a black image region contained in the acquired image to decrease the incident-light reduction amount, thereby controlling the plurality of light-amount adjusting sections independently of one another. In other words, each of the plurality of light-amount adjusting sections adjusts the incident-light reduction amount so that the amount of incident light that actually enters each of the optical sensing sections through regions corresponding to the white image portion or the black image portion so as to ensure that it falls within the detectable range after the adjustment thereof even in a case where it is difficult to identify a target-image region that indicates the shade of the pointing means in the acquired image and where it is difficult to make a predetermination as to whether the target-image region corresponding to the pointing means is contained in the white image portion or the black image portion prior to the identification of the target-image region that indicates the shade of the pointing means in the acquired image.

Specifically, the controlling section of the liquid crystal device having the above-described preferred configuration of the invention performs light-amount control so as to increase the incident-light reduction amount of (i.e., for) the group of the light-amount adjusting sections that are arrayed in an area corresponding to the white image region in the image display area over the first substrate thereof, which results in a decrease in the amount of the incident light that enters the optical sensing sections that are arrayed in this area corresponding to the white image region in the image display area thereof. On the other hand, the controlling section of the liquid crystal device having the above-described preferred configuration of the invention performs light-amount control so as to decrease the incident-light reduction amount of the group of the light-amount adjusting sections that are arrayed in an area corresponding to the black image region in the image display area over the first substrate thereof, which results in an increase in the amount of the incident light that enters the optical sensing sections that are arrayed in this area corresponding to the black image region in the image display area thereof.

As explained above, since the amount of incident light that enters each of the optical sensing sections corresponding to the white image portion or the black image portion is adjusted on an individual basis, it is possible to widen a detectable range within which the optical sensing sections can actually detect the light amount thereof. That is, it is possible to widen a range in which the optical sensing sections can output signals having gradation levels that vary from one to another in accordance with the difference in the amount of light therebetween. Thus, the controlling section of the liquid crystal device having the above-described preferred configuration of the invention makes it possible to improve the light-amount detection capability of the optical sensing sections.

In the preferred configuration described above, since the amount of incident light that enters each of the optical sensing sections corresponding to the white image portion or the black image portion is adjusted on an individual basis, it is possible to acquire an image that contains the target-image portion of a pointing means in such a manner that it has an appropriate gradation level that is sufficient for detecting the target-image portion of the pointing means, thereby making it possible to discriminate the target-image region of the pointing means from other non-target-image region, without any necessity to make a predetermination as to whether the target-image region corresponding to the pointing means is contained in the white image portion or the black image portion. Therefore, even in a case where the use environment of the liquid crystal device having the preferred configuration described above changes, which is affected by ambient conditions such as the optical intensity of external light, though not limited thereto, it is possible to adjust the amount of incident light that enters the optical sensing sections into an appropriate detection range, thereby making it further possible to identify the location of a pointing means accurately.

In the configuration of the liquid crystal device according to the first aspect of the invention, it is preferable that each of the plurality of light-amount adjusting sections should have a liquid crystal element, the liquid crystal element having the liquid crystal portion as well as a first electrode and a second electrode that, in combination with each other, control the liquid crystal portion; and each of the plurality of light-amount adjusting sections should further have a first polarizing layer that is formed between the optical sensing section and the liquid crystal layer over the first substrate and a second polarizing layer that is formed at a second-substrate side when viewed from the liquid crystal layer.

In such a preferred configuration of the invention, it is a voltage corresponding to a difference between the electric potential of the first electrode and the electric potential of the second electrode that determines the alignment/orientation state of the liquid crystal portion of each liquid crystal element thereof that overlaps the corresponding optical sensing section in a plan view, which constitutes a part of a liquid crystal layer through which light for image display is modulated. Incident light that enters the light-amount adjusting section is optically modulated at the liquid crystal portion thereof. In addition, the first polarizing layer and the second polarizing layer are provided along the optical propagation path of incident light with the liquid crystal element being interposed therebetween. Similar to the control of the optical intensity of display light by means of the alignment-state control of the liquid crystal layer in each pixel, such a layer configuration makes it possible to adjust the amount of incident light that enters the optical sensing section.

It is preferable that the liquid crystal device having a preferred configuration described above should further include: a plurality of pixel electrodes each of which is provided in the corresponding one of a plurality of pixel units that make up the image display area over the first substrate, wherein the first electrode of the liquid crystal element is formed in the same layer as that of the pixel electrodes.

For example, in the manufacturing process of a liquid crystal device having such a preferred configuration of the invention, it is possible to form the first electrode of the liquid crystal element and the pixel electrode, which is configured as a transparent electro-conductive electrode that is made of a transparent electro-conductive material such as ITO or the like, in the same single electrode formation process, which offers a more simplified and thus efficient production thereof in comparison with a case where the first electrode of the liquid crystal element is manufactured in one electrode formation process whereas the pixel electrode is manufactured in another electrode formation process.

In the liquid crystal device having such a preferred configuration of the invention, it is preferable that each of the first polarizing layer and the second polarizing layer should extend so as to overlap the pixel electrodes in a plan view.

In such a preferred configuration, each partial region of each of the first polarizing layer and the second polarizing layer that overlaps the corresponding pixel electrode in a plan view functions as a polarizing plate that selectively transmits a linearly polarized component of display light that is modulated in the image display area thereof. Therefore, in the manufacturing process of the liquid crystal device having the preferred configuration described above, it is possible to form a polarizing plate that defines/specifies the transmission amount of display light for image display and the first polarizing layer/second polarizing layer in the same single formation process, which offers a more simplified and thus efficient production thereof in comparison with a case where the polarizing plate that defines/specifies the transmission amount of display light for image display is manufactured in one formation process whereas the first polarizing layer and the second polarizing layer are manufactured in another formation process.

It is preferable that the liquid crystal device having a preferred configuration described above should further include: a third polarizing layer that has an optical axis extending along the optical axis of the first polarizing layer, the third polarizing layer being provided at a first-substrate side when viewed from the optical sensing sections, and the third polarizing layer extending so as to overlap the pixel electrodes in a plan view.

In such a preferred configuration, functioning in cooperation with the partial region of the first polarizing layer that overlaps the pixel electrode in a plan view, the third polarizing layer ensures that display light that enters each pixel is subjected to linear polarization.

In order to address the above-identified problem without any limitation thereto, the invention provides, as a second aspect thereof, an image sensor including: a substrate; a plurality of optical sensing sections that is formed in an image detection area over the substrate; and a plurality of light-amount adjusting sections that is formed in the image detection area over the substrate, the plurality of light-amount adjusting sections being capable of adjusting, independently of one another, the amount of incident light that enters the plurality of optical sensing sections.

As a liquid crystal device according to the first aspect of the invention is capable of identifying the position (i.e., location) of a pointing means in a precise manner, so an image sensor according to the second aspect of the invention is capable of acquiring an image in which the target-image region of the pointing means can be discriminated from other non-target-image region. Thus, the image sensor according to the second aspect of the invention can accurately identify a detection target object, offering a significantly enhanced target detection capability.

In order to address the above-identified problem without any limitation thereto, the invention provides, as a third aspect thereof, an electronic apparatus that is provided with a liquid crystal device according to the first aspect of the invention.

According to an electronic apparatus of this aspect of the invention, it is possible to embody various kinds of electronic devices that has a touch panel input function and are capable of providing a high-quality image display, including but not limited to, a mobile phone, an electronic personal organizer, a word processor, a direct-monitor-view-type video tape recorder, a workstation, a videophone, a POS terminal, and so forth, because the electronic apparatus of this aspect of the invention is provided with the liquid crystal device according to the above-described aspect of the invention. In addition, as an example of an electronic apparatus of this aspect of the invention, it is possible to embody an electrophoresis apparatus such as an electronic paper.

These and other features, operations, and advantages of the present invention will be fully understood by referring to the following detailed description in conjunction with the accompanying drawings.

BRIEF DESCRIPTION OF THE DRAWINGS

The invention will be described with reference to the accompanying drawings, wherein like numbers reference like elements.

FIGS. 14A and 14B is a set of concept diagrams that schematically illustrates two examples of images that have been subjected to correction processing according to an exemplary embodiment of the invention, which is performed in such a manner that each of a plurality of light amount adjustment units adjusts the amount of incident light on an individual basis; and therefore, as a result of such correction processing unique to the invention, the target-image region of a pointing means can be discriminated from other non-target-image region.

FIG. 15 is a graph that shows an example of the relationship between the amount of incident light that can be detected by an optical sensor unit and a voltage at the terminals of a light-sensitive pickup element.

DESCRIPTION OF EXEMPLARY EMBODIMENTS

With reference to the accompanying drawings, a liquid crystal device, an image sensor, and an electronic apparatus according to exemplary embodiments of the invention are explained below.

1. Liquid Crystal Device 1-1: General Configuration of Liquid Crystal Device

Figure 1:
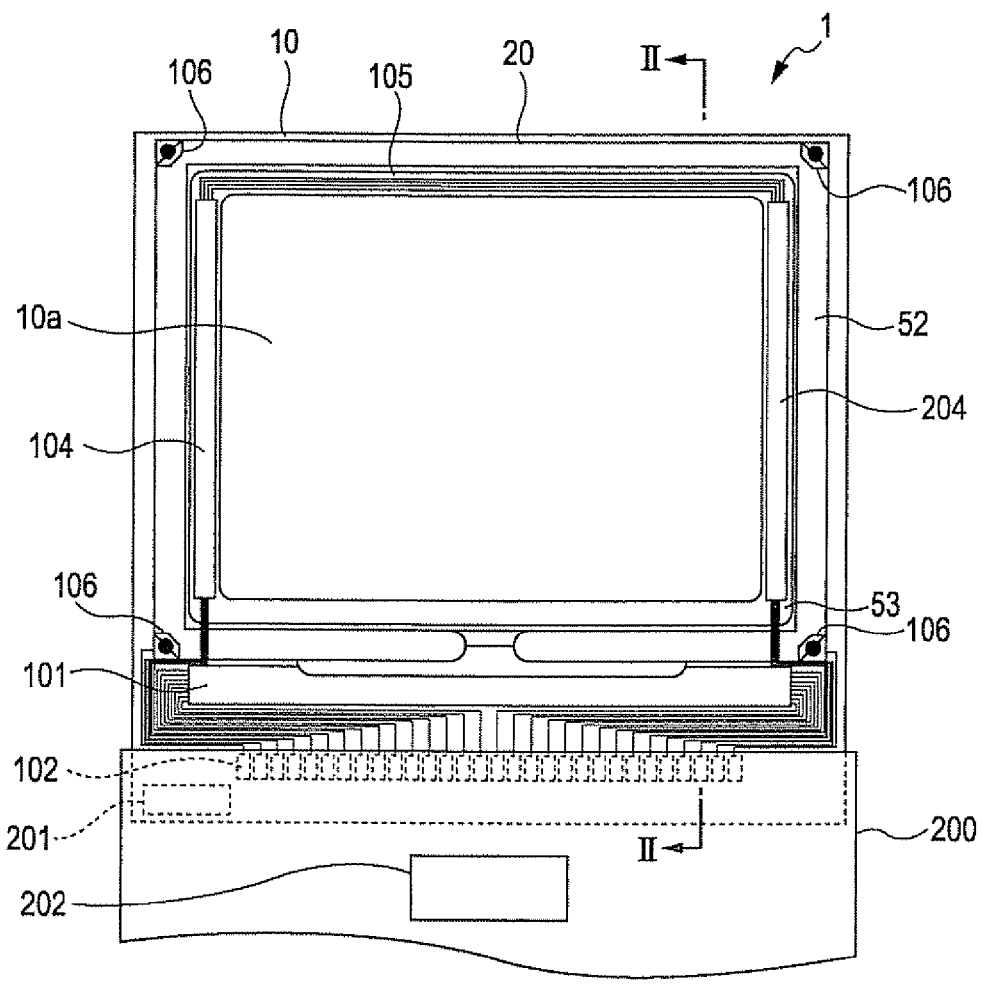
FIG. 1 is a plan view that schematically illustrates an example of the configuration of a liquid crystal device according to an exemplary embodiment of the invention.
Figure 2:
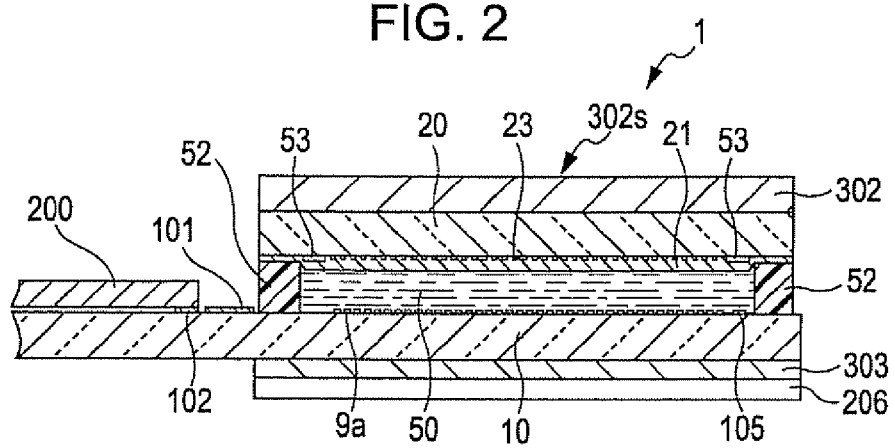
FIG. 2 is a sectional view taken along the line II-II of FIG. 1.

First of all, with reference to FIGS. 1 and 2, an explanation is given below of the general configuration of a liquid crystal device 1 according to an exemplary embodiment of the invention. FIG. 1 is a plan view of the liquid crystal device 1 that schematically illustrates an example of the configuration of a TFT array substrate and various components formed or deposited thereon, which are viewed in combination from a certain point at the counter-substrate side. FIG. 2 is a cross sectional view taken along the line II-II of FIG. 1. The liquid crystal device 1 according to the present embodiment of the invention is provided with a built-in driving circuit. The liquid crystal device 1 according to the present embodiment of the invention operates in a TFT active matrix drive scheme.

As illustrated in FIGS. 1 and 2, in the configuration of a liquid crystal device 1 according to the present embodiment of the invention, a TFT array substrate 10 and a counter substrate 20 are provided in such a manner that they face each other, that is, at positions opposite each other. The TFT array substrate 10 is a non-limiting example of a "first substrate" according to the invention, whereas the counter substrate 20 is a non-limiting example of a "second substrate" according to the invention. A liquid crystal layer 50 is sealed between the TFT array substrate 10 and the counter substrate 20. The TFT array substrate 10 and the counter substrate 20 are adhered to (e.g., bonded to) each other with the use of a sealant material 52 that is provided at a sealing region around an image display region 10a of the liquid crystal device 1. The image display region 10a thereof is a display area in which a plurality of pixel units is provided/arrayed.

The sealant material 52 is made from, for example, an ultraviolet (UV) curable resin, a thermosetting resin, or the like, which functions to paste these substrates together. In the production process of the liquid crystal device, the sealant material 52 is applied onto the TFT array substrate 10 and subsequently hardened through an ultraviolet irradiation treatment, a heat treatment, or any other appropriate treatment. A gap material such as glass fibers, glass beads, or the like, are scattered in the sealant material 52 so as to set the distance (i.e., inter-substrate gap) between the TFT array substrate 10 and the counter substrate 20 at a predetermined gap value.

Inside the sealing region at which the sealant material 52 is provided, and in parallel therewith, a picture frame light-shielding film 53, which has a light-shielding property and defines the picture frame region of the image display region 10a, is provided on the counter substrate 20. Notwithstanding the above, a part or a whole of the picture frame light-shielding film 53 may be provided at the TFT-array-substrate (10) side as a built-in light-shielding film. A peripheral region surrounds the image display region 10a. In other words, in the configuration of the liquid crystal device a according to the present embodiment of the invention, an area that is farther than the picture frame light-shielding film 53 when viewed from the center of the TFT array substrate 10, that is, an area that is not inside but outside the picture frame light-shielding film 53, is defined as the peripheral region.

The liquid crystal device 1 is provided with a data line driving circuit unit (i.e., display signal driving circuit unit) 101, a scanning line driving circuit unit 104, and a sensor scanning circuit unit 204. Among a plurality of sub-peripheral regions that make up the peripheral region described above, the data line driving circuit 101 and external circuit connection terminals 102 are provided at one sub-peripheral region which lies outside the sealing region at which the sealant material 52 is provided in such a manner that these data line driving circuit 101 and external circuit connection terminals 102 are provided along one of four sides of the TFT array substrate 10, which is, in the illustrated example, the lower side. The scanning line driving circuit 104 is provided along, in the illustrated example, one of two vertical sides (e.g., left side) that extend in a direction perpendicular to the above-mentioned one side (i.e., lower side) in such a manner that the scanning line driving circuit 104 is enclosed by the picture frame light-shielding film 53. The sensor scanning circuit 204 is provided in such a manner that it extends in parallel with the scanning line driving circuit 104 that extends along the above-mentioned one side (e.g., left side), which is opposite to the other side (e.g., right side) along which the sensor scanning circuit 204 extends, with the image display area 10a being interposed therebetween. In addition to the above, a plurality of electric wirings 105 is provided along the remaining one side (i.e. r upper side) that is parallel with the first-mentioned side (i.e., lower side) of the TFT array substrate 10 in such a manner that the plurality of electric wirings 105 is enclosed by the picture frame light-shielding film 53 so as to electrically connect the scanning line driving circuit 104 and the sensor scanning circuit 204.

A controlling circuit unit 201 is provided in the peripheral region over the TFT array substrate 10. The controlling circuit unit 201 has a plurality of circuits that is responsible for processing signals outputted from an optical sensor unit, which will be described later, and is further responsible for controlling the "incident-light shielding amount" (e.g., incident-light intensity reduction amount) that is used by a light amount adjustment unit, which will also be explained later, so as to optimize the amount of light. It should be noted that the controlling circuit unit 201 constitutes a non-limiting example of a "controlling section" according to the invention. For connection to the image display area 10a with a simple configuration, it is preferable to form the controlling circuit unit 201 and the data line driving circuit 101 as a single (i.e., integrated) circuitry. Or, alternatively, it is preferable to form a "received-light" signal processing circuit unit 215, which is one functional component unit of the controlling circuit unit 201, and the data line driving circuit 101 as a single circuitry for the same reason as above.

The external circuit connection terminals 102 are connected to the connection terminals of a flexible printed circuit (hereafter abbreviated as "FPC") 200, which is an example of a connecting means that provides an electric connection between external circuits and the liquid crystal device 1. The liquid crystal device 1 has a backlight. A backlight control circuit unit 202 controls the operation of the backlight of the liquid crystal device 1. The backlight control circuit unit 202 has an IC circuitry and the like that is formed on the FPC 200.

Inter-substrate conductive material 106, which functions as conductive terminals that connect the TFT array substrate 10 with the counter substrate 20, are provided at four corners of the counter substrate 20. On the other hand, another set of inter-substrate conductive terminals is provided also on the TFT array substrate 10 at positions each of which is opposite to the corresponding one of the four conductive terminals of the counter substrate 20. With such a structure, it is possible to establish electric conduction (i.e., connection) between the TFT array substrate 10 and the counter substrate 20.

As illustrated in FIG. 2, a layered structure (i.e., lamination structure) that includes laminations of TFTs for pixel switching, which are driving/driver elements, and of wirings/lines such as scanning lines, data lines, and the like is formed on the TFT array substrate 10, Pixel electrodes 9a are formed at a layer above the lamination structure described above. An orientation film (i.e., alignment film) is deposited on the pixel electrodes 9a. On the other hand, a counter electrode 21 is formed on the counter substrate 20. A light-shielding film 23 that has either a grid pattern or stripe pattern is formed thereon. At the uppermost layer of a lamination structure formed on the counter substrate 20, an orientation film is formed. The liquid crystal layer 50 is made of liquid crystal that consists of, for example, a mixture of one or more types of nematic liquid crystal element. Such a liquid crystal takes a predetermined orientation state between a pair of the above orientation films (i.e., alignment films).

The liquid crystal device 1 is provided with a second polarizing plate 302, a third polarizing plate 303, and a backlight 206. The second polarizing plate 302 is formed on the counter substrate 20. As illustrated in FIG. 2, the third polarizing plate 303 is provided under the TFT array substrate 10. Specifically, the third polarizing plate 303 is sandwiched between the backlight 206 and the TFT array substrate 10. When it is operated, the liquid crystal device 1 displays an image on an image display surface 302s thereof. The image display surface 302s is one of two surfaces of the second polarizing plate 302 that does not face the counter substrate 20, that is, an exposed surface thereof.

It should be noted that other functional circuits may also be provided on the TFT array substrate 10 illustrated in FIGS. 1 and 2 in addition to driving circuits such as the above-described data line driving circuit 101, the scanning line driving circuit 104, and the like, including but not limited to, a sampling circuit that performs the sampling of an image signal that flows on an image signal line so as to supply the sampled signal to a data line, a pre-charge circuit that supplies a pre-charge signal having a predetermined voltage level to each of the plurality of data lines prior to the supplying of an image signal, a test circuit for conducting an inspection on the quality, defects, etc., of the electro-optical device (e.g., liquid crystal device) during the production process or before shipment, and the like.

1-2: Circuit Configuration of Liquid Crystal Device

Figure 3:
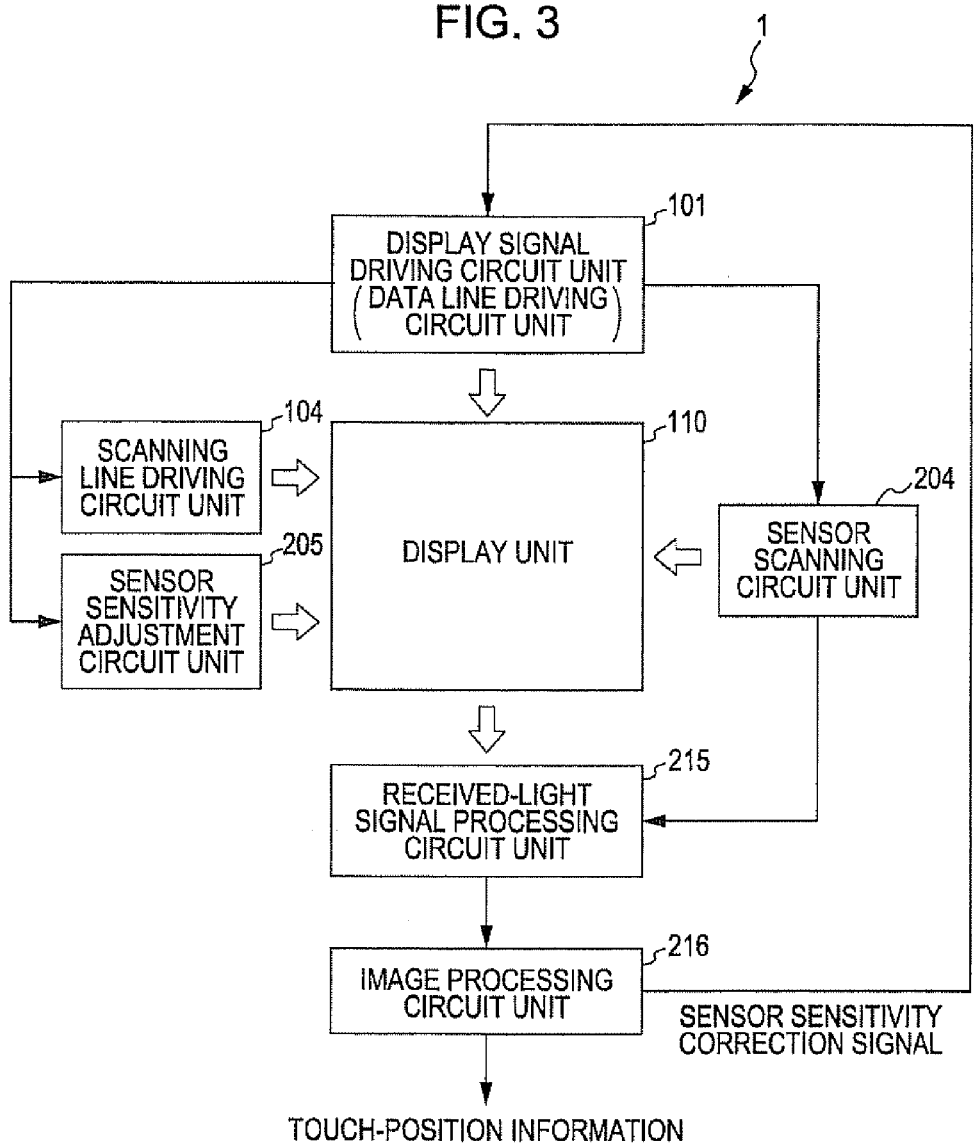
FIG. 3 is a block diagram that illustrates an example of the main circuit configuration of a liquid crystal device according to an exemplary embodiment of the invention.

Next, with reference to FIG. 3, the general circuit configuration of the liquid crystal device 1 is explained below. FIG. 3 is a block diagram that illustrates an example of the main circuit configuration of the liquid crystal device 1 according to an exemplary embodiment of the invention.

As illustrated in FIG. 3, the liquid crystal device 1 according to an exemplary embodiment of the invention is provided with the aforementioned data line driving circuit unit 101, the aforementioned scanning line driving circuit unit 104, a sensor sensitivity adjustment circuit unit 205, the aforementioned sensor scanning circuit 204, the aforementioned received-light signal processing circuit unit 215, an image processing circuit unit 216, and a display unit 110. The aforementioned controlling circuit unit 201 that is illustrated in FIG. 1 is made up of, though not necessarily limited thereto, the sensor sensitivity adjustment circuit unit 205, the received-light signal processing circuit unit 215, and the image processing circuit unit 216. In other words, the sensor sensitivity adjustment circuit unit 205, the received-light signal processing circuit unit 215, and the image processing circuit unit 216, though not necessarily limited thereto, constitute the functional component units of the controlling circuit unit 201.

As will be described later, the display unit 110 is made up of a plurality of pixel units (i.e., pixels) that are arrayed in a matrix pattern. The data line driving circuit unit 101 supplies an image signal to the display unit 110 at a predetermined timing, whereas the scanning line driving circuit unit 104 supplies a scanning signal to the display unit 110 at a predetermined timing. By this means, the data line driving circuit unit 101 as well as the scanning line driving circuit unit 104 functions as a driver unit that operates each of the pixels arrayed thereat.

When the liquid crystal device 1 is operated, the sensor scanning circuit unit 204 supplies a signal for operating an optical sensor unit, which will be explained later, to the optical sensor unit. The received-light signal processing circuit unit 215 processes a "detected-light" signal that is outputted from the optical sensor units arrayed in the image display region 10a over the TFT array substrate 10.

The image processing circuit unit 216 processes image data that is prepared on the basis of a processed signal that is supplied from the received-light signal processing circuit unit 215. In a case where the image processing circuit unit 216 has successfully recognized a pointing means such as a finger of a user, though not limited thereto, which points to the image display surface 302s of the liquid crystal device, by utilizing an image that is acquired on the basis of a signal indicating the reception of light at each of a plurality of optical sensor units of the display unit 110, the image processing circuit unit 216 identifies the location of the pointing object that points to the image display surface 302s in the image display region 10a. Then, the image processing circuit unit 216 outputs the identified position of the pointing means to an external circuit unit as touch-position information. On the other hand, if the image processing circuit unit 216 cannot successfully identify the location of the pointing means, it supplies a correction signal to the data line driving circuit unit 101 so as to correct the sensitivity of the optical sensor units. On the basis of the correction signal, the "incident-light shielding amount" (e.g., incident-light intensity reduction amount), which will be used by a plurality of light amount adjustment units (which will be explained later) for adjusting the amount of incident light that enters the optical sensor units, is controlled on an individual basis so that it varies from one (group of) light amount adjustment unit(s) to another (group of) light amount adjustment unit(s).

1-3: Configuration of Pixel Units

Figure 4:
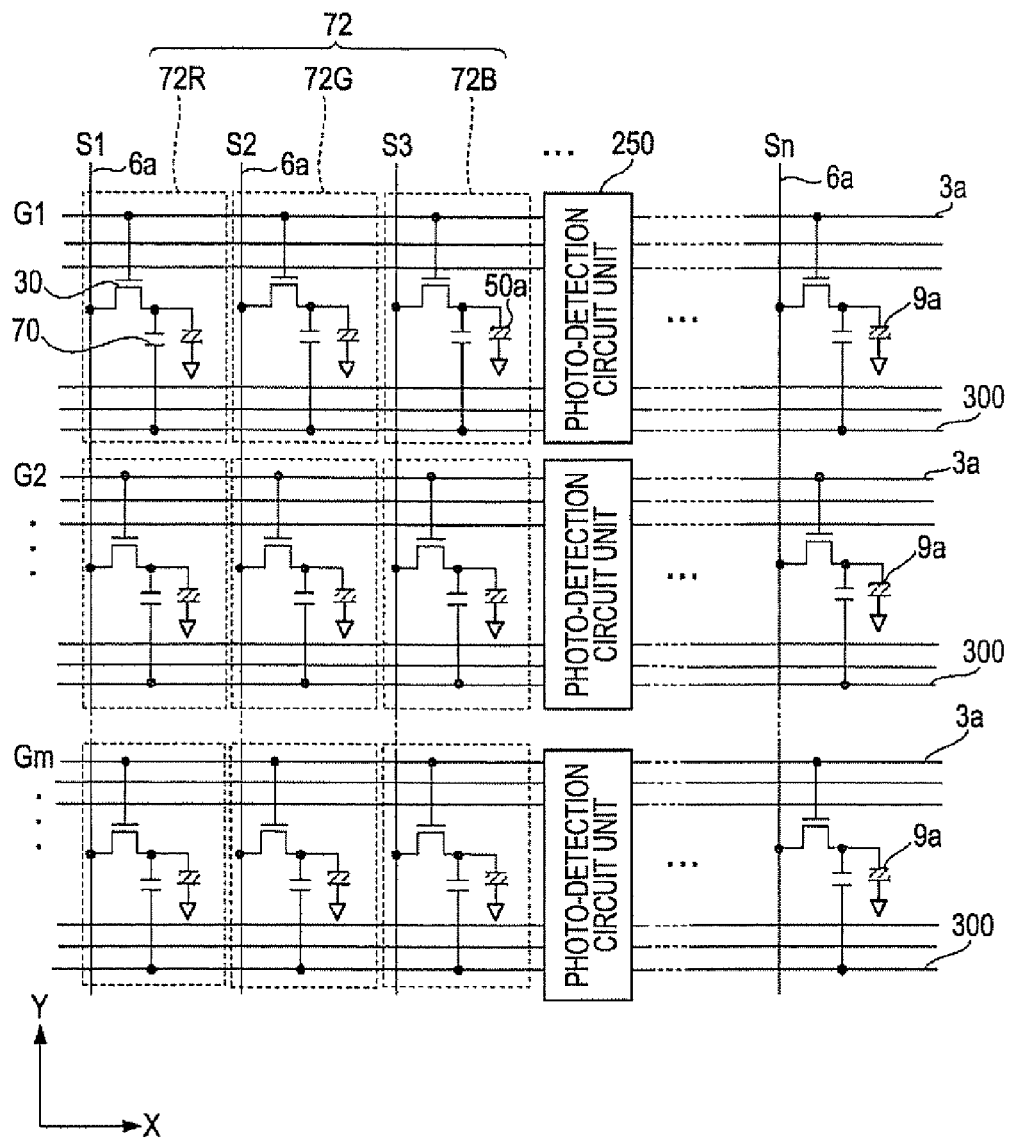
FIG. 4 is an equivalent circuit diagram that illustrates an example of constituent elements and wirings in a plurality of pixels that are arranged in a matrix pattern so as to constitute the image display area of a liquid crystal device according to an exemplary embodiment of the invention.
Figure 5:
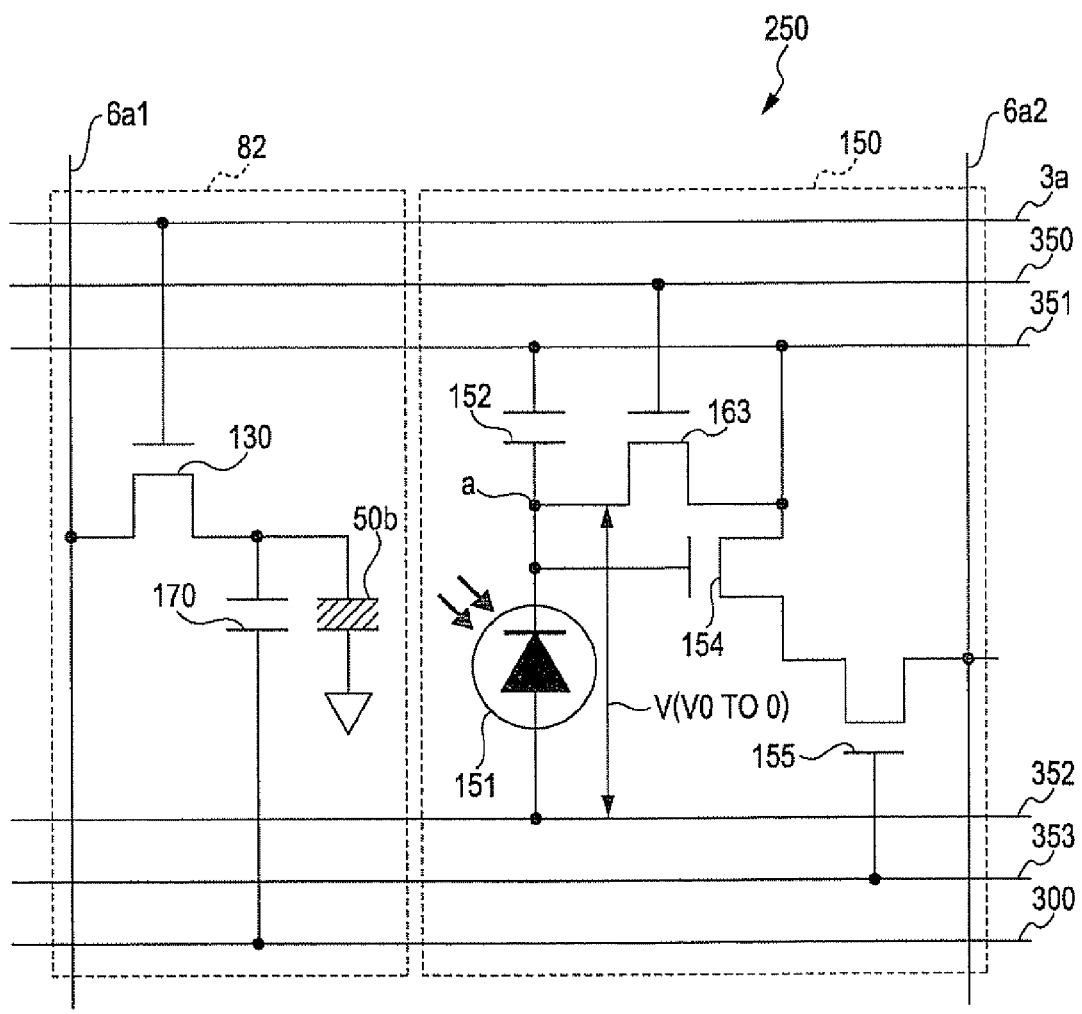
FIG. 5 is a circuit diagram that illustrates, in a close-up view, an example of the electric configuration of a photo-detection circuit unit that is illustrated in FIG. 4.
Figure 6:
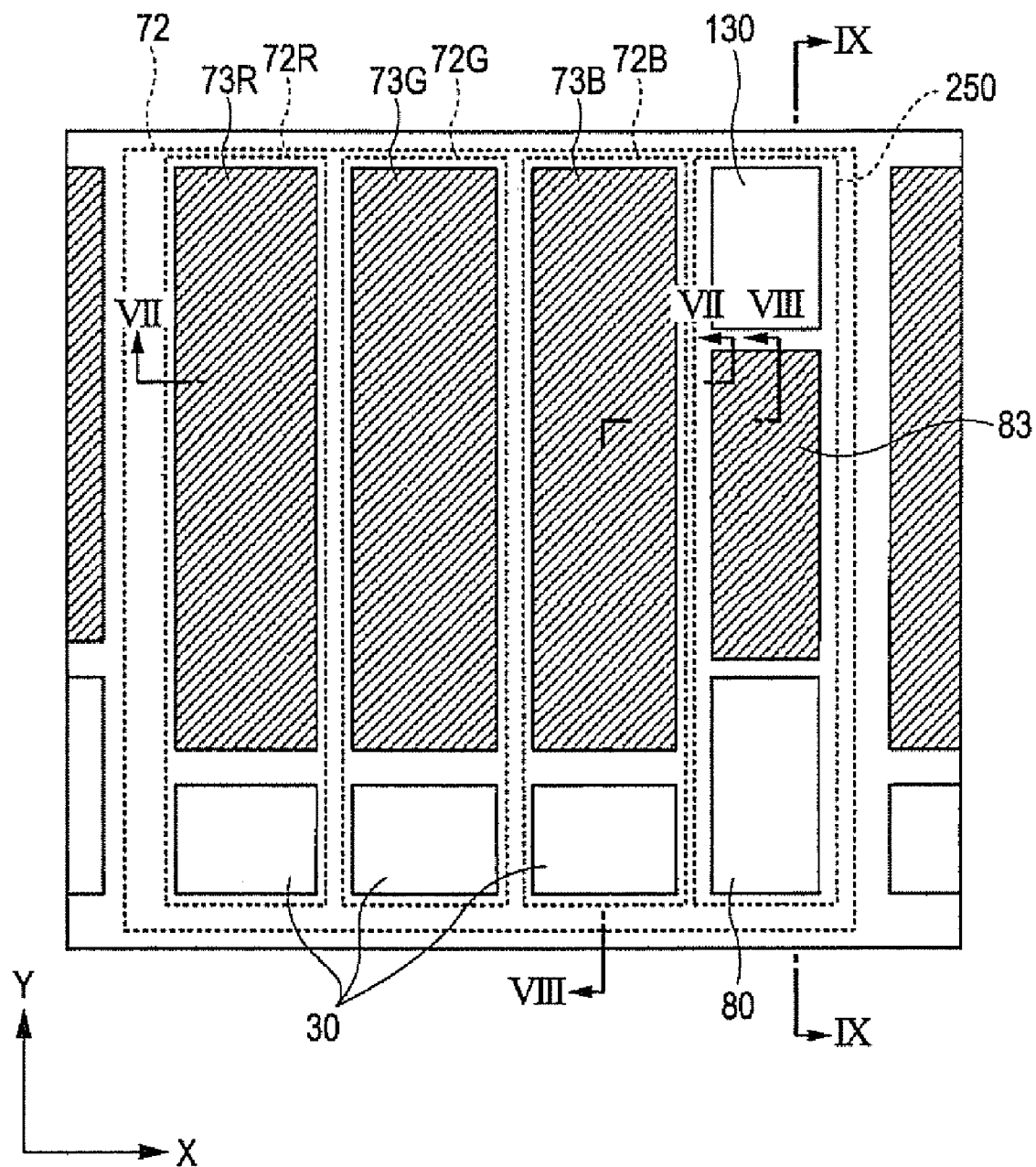
FIG. 6 is a plan view that schematically illustrates an example of the configuration of a pixel unit of a liquid crystal device according to an exemplary embodiment of the invention.
Figure 7:
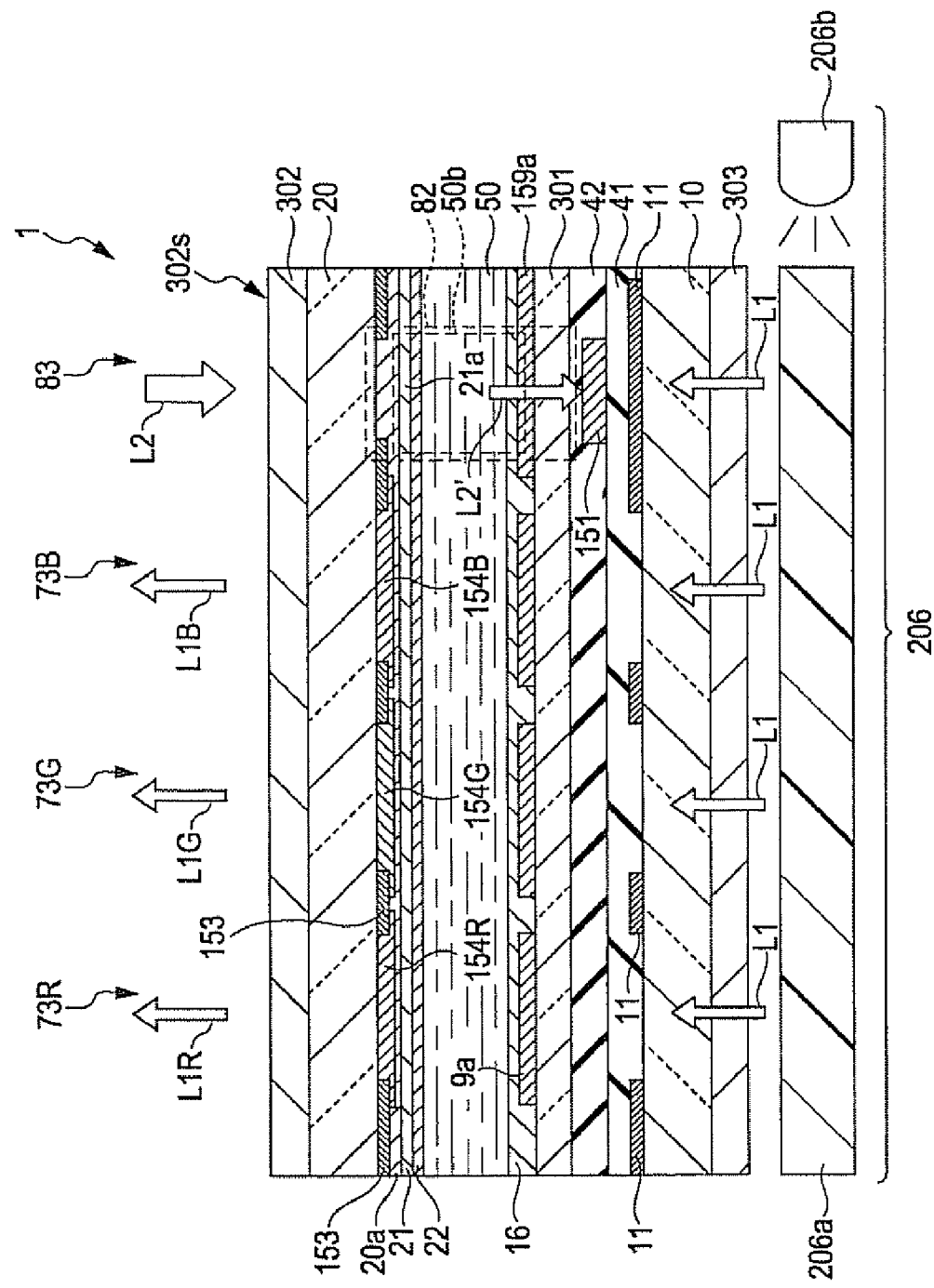
FIG. 7 is a sectional view taken along the line VII-VII of FIG. 6.
Figure 8:
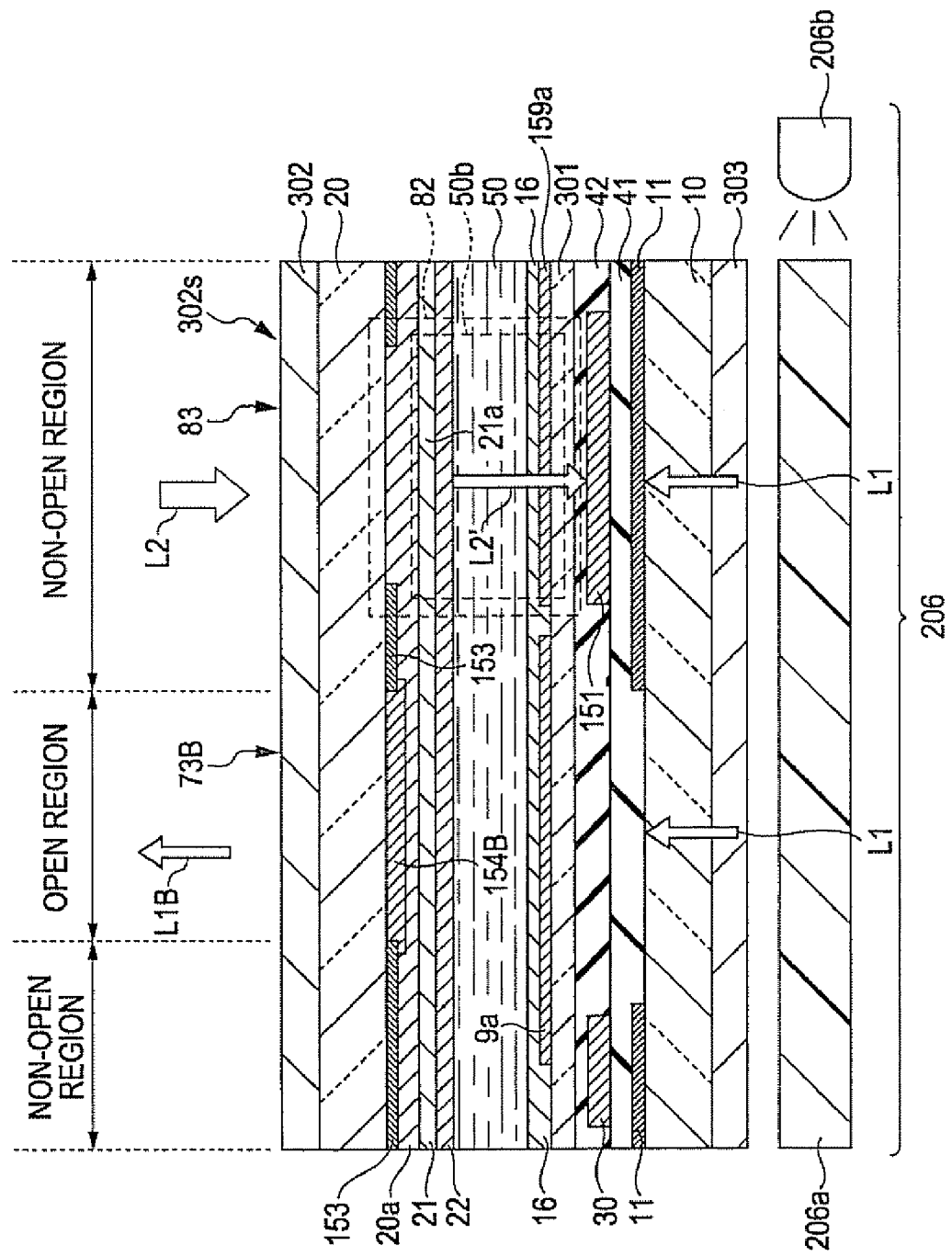
FIG. 8 is a sectional view taken along the line VIII-VIII of FIG. 6.
Figure 9:
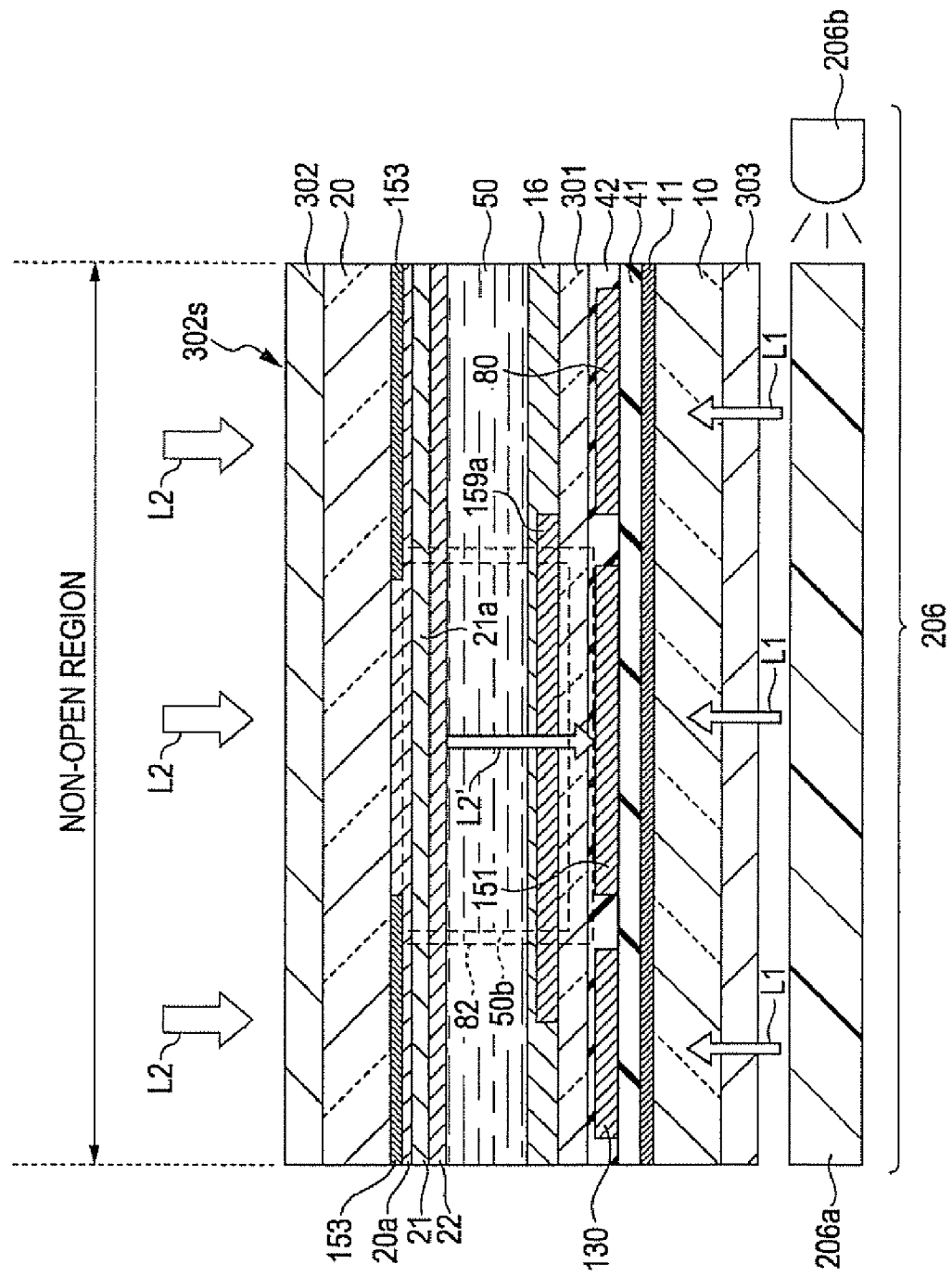
FIG. 9 is a sectional view taken along the line IX-IX of FIG. 6.
Figure 10:
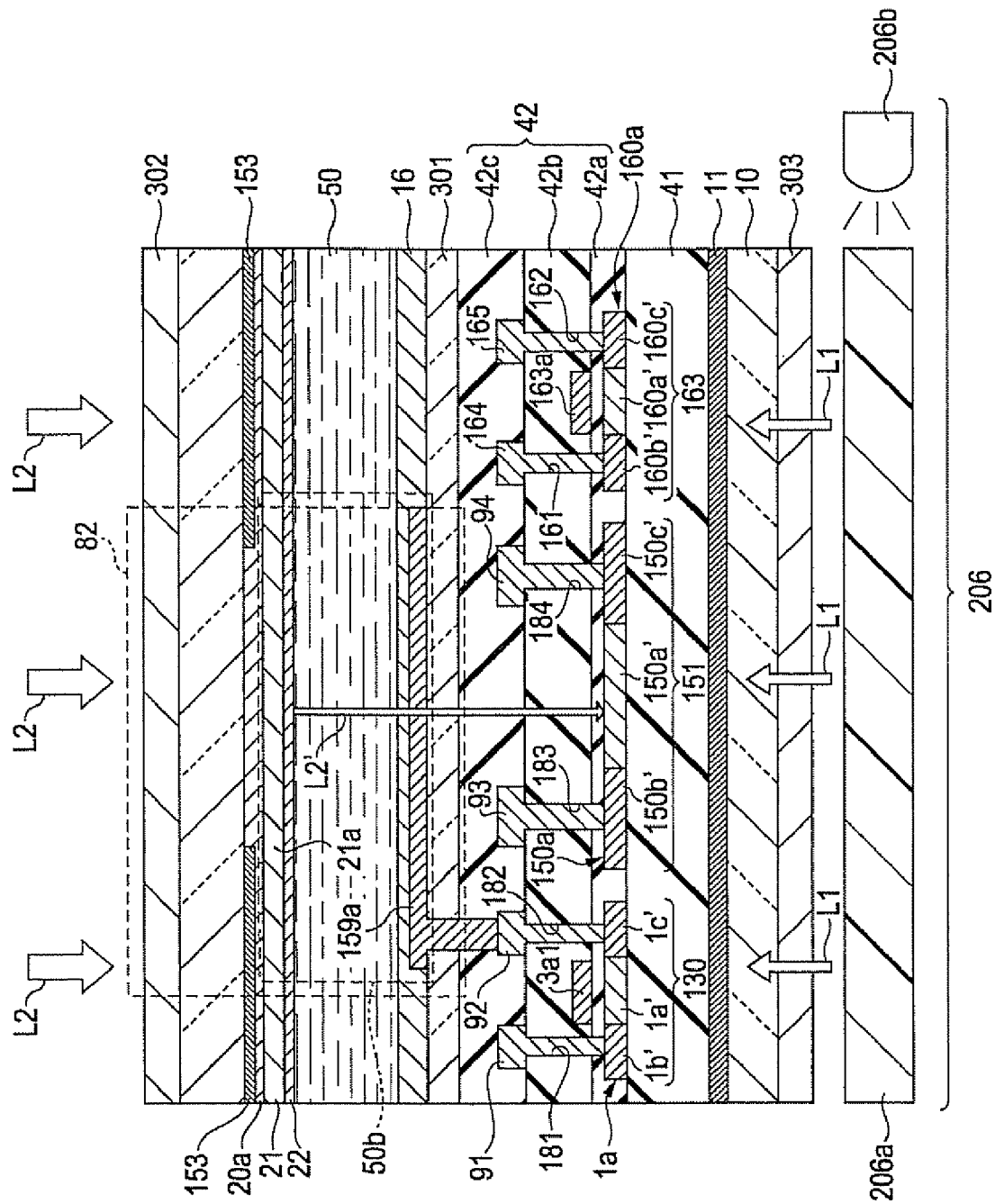
FIG. 10 is a sectional view that illustrates a section shown in FIG. 9 in a detailed view.

Next, with reference to FIGS. 4-11, the configuration of the pixel units (i.e., pixels) of the liquid crystal device 1 is explained in detail below. FIG. 4 is an equivalent circuit diagram that illustrates an example of constituent elements and wirings in a plurality of pixels that are arranged in a matrix pattern so as to constitute the image display region (i.e., image display area) 10a of the liquid crystal device 1 according to the present embodiment of the invention. FIG. 5 is a circuit diagram that illustrates, in a close-up view, an example of the electric configuration of a photo-detection circuit unit (250) that is illustrated in FIG. 4. FIG. 6 is a plan view that schematically illustrates an example of the configuration of a pixel unit of the liquid crystal device 1 according to an exemplary embodiment of the invention. FIG. 7 is a sectional view taken along the line VII-VII of FIG. 6. FIG. 8 is a sectional view taken along the line VIII-VIII of FIG. 6. FIG. 9 is a sectional view taken along the line IX-IX of FIG. 6. FIG. 10 is a sectional view that illustrates a section shown in FIG. 9 in a detailed view. It should be noted that FIG. 4 illustrates photo-detection circuit units (250) together with the general circuit configuration of a partial region of each of a plurality of pixel units that are arrayed in a matrix pattern over the TFT array substrate 10, where the partial region thereof actually contributes to image display. In referring to FIGS. 7-10, it should be noted that different scales are used for layers/members so that each of the layers/members has a size that is easily recognizable in each of these drawings.

With reference to FIG. 4, an explanation is given below of the circuit configuration of a pixel unit 72 according to an exemplary embodiment of the invention. As illustrated in FIG. 4, each of a plurality of pixel units 72 that are arrayed in a matrix pattern so as to constitute the image display area 10a of the liquid crystal device 1 has a sub pixel unit 72R that displays red (i.e., R color component), a sub pixel unit 72G that displays green (i.e., G color component), and a sub pixel unit 72B that displays blue (i.e., B color component). Each of the plurality of pixel units 72 is electrically connected to the corresponding one of a plurality of photo-detection circuit units 250, which is formed in the image display area 10a thereof. With such a pixel array configuration, the liquid crystal device 1 is capable of displaying a full-color image. Each of the sub pixel units 72R, 72G, and 72B has the pixel electrode 9a, a TFT 30, and a liquid crystal element 50a.

The TFT 30 is electrically connected to the pixel electrode 9a so as to perform switching control on the pixel electrode 9a at the time of operation of the liquid crystal device 1. Each of data lines 6a to which image signals are supplied is electrically connected to the source of the TFT 30. Image signals S1, S2, . . . , and Sn that are written on the data lines 6a may be supplied respectively in the order of appearance herein (i.e., in the order of S1, S2, . . . , and Sn) in a line sequential manner. Alternatively, an image signal may be supplied to each of a plurality of groups of the data lines 6a, where each group consists of a bundle of the data lines 6a adjacent to each other (one another).

Each of scanning lines 3a is connected to the gate of the TFT 30. The liquid crystal device 1 according to the present embodiment of the invention is configured to apply, at a predetermined timing and in a pulse pattern, scanning signals G1, G2, . . . , and Gm to the scanning lines 3a in the order of appearance herein in a line sequential manner. Each of the pixel electrodes 9a is electrically connected to the drain (region/electrode) of the TFT 30. When the switch of the TFT 30, which functions as a switching element, is closed for a certain time period, the image signal S1, S2, or Sn that is supplied through the data line 6a is written at a predetermined timing. After being written into liquid crystal via the pixel electrodes 9a, the image signals S1, S2, . . . , and Sn having a predetermined level are held for a certain time period between the pixel electrode 9a and the counter electrode 21 formed on the counter substrate 20.

Liquid crystal that is sealed in the liquid crystal layer 50 changes its orientation and/or its order of molecular association depending on the level of a voltage that is applied thereto. By this means, it modulates light to realize a gradation display. Under a "normally-white" mode, the optical transmittance (i.e., light transmission factor) with respect to an incident light beam decreases in accordance with a voltage applied on a sub-pixel-by-sub-pixel basis (i.e., to each sub pixel), whereas, under a "normally-black" mode, the optical transmittance with respect to an incident light beam increases in accordance with a voltage applied on a sub-pixel-by-sub-pixel basis. Thus, when viewed as a whole, light having a certain contrast in accordance with an image signal is emitted from the liquid crystal device 1. In order to prevent the leakage of the image signals being held, a storage capacitor 70 is added in electrically parallel with the liquid crystal element 50a that is formed between the pixel electrode 9a and the counter electrode 21. A capacitor electrode line 300 is one of a pair of electrodes of the storage capacitor 70. Specifically, the capacitor electrode line 300 is a fixed-electric-potential-side capacitor electrode thereof.

Next, with reference to FIG. 5, the circuit configuration of the photo-detection circuit unit 250 is explained in detail below.

As shown in FIG. 5, the photo-detection circuit unit 250 is provided with a light amount adjustment unit 82 and an optical sensor unit 150.

The light amount adjustment unit 82 has a liquid crystal element 50b, an adjustment-controlling TFT 130, and a storage capacitor 170. The liquid crystal element 50b is a non-limiting example of a "liquid crystal element" according to the invention. The light amount adjustment unit 82 is included in each of the plurality of photo-detection circuit units 250. Under the control of the controlling circuit unit 201, the plurality of light amount adjustment units 82 operates independently of each other (one another) in the image display region 10a.

The liquid crystal element 50b is electrically connected to the adjustment-controlling TFT 130 and the storage capacitor 170. The adjustment-controlling TFT 130 controls the alignment state, that is, orientation state, of the liquid crystal molecule portion of the liquid crystal element 50b. By this means, the amount of incident light that enters the optical sensor unit 150 is adjusted. A more detailed explanation thereof will be given later. One of a pair of capacitor electrodes of the storage capacitor 170 is electrically connected to the aforementioned fixed electric-potential line (i.e., capacitor electrode line) 300.

The gate electrode of the adjustment-controlling TFT 130 is electrically connected to the scanning line 3a, whereas the source electrode thereof is electrically connected to a signal line 6a1. The ON/OFF state of the adjustment-controlling TFT 130 is switched over therebetween by means of a selection signal that is supplied thereto via the scanning line 3a. The adjustment-controlling TFT 130 supplies, to the liquid crystal element 50b, an adjustment signal that is supplied thereto via the signal line 6a1 depending on the ON/OFF state thereof. As the adjustment-controlling TFT 130 controls the alignment state of liquid crystal molecule portion of the liquid crystal element 50b by means of the adjustment signal, the amount of incident light that enters the optical sensor unit 150 is subject to adjustment.

As an exemplary configuration thereof, the optical sensor unit 150 has a light-sensitive pickup element 151 such as a photodiode, though not limited thereto, a storage capacitor 152, a reset TFT 163, a signal-amplifying TFT 154, and an output-controlling TFT 155.

The light-sensitive pickup element 151 receives "light-amount-adjusted" incident light L2', which is obtained after that incident light L2, which enters through the image display surface 302s in the image display area 10a of the liquid crystal device 1, has been subjected to light-amount adjustment performed by the light amount adjustment unit 82 (refer to FIGS. 7-9). The source electrode of the reset TFT 163 is electrically connected to the light-sensitive pickup element 151. The gate electrode of the reset TFT 163 is electrically connected to a reset signal line 350. The drain electrode of the reset TFT 163 is electrically connected to the signal-amplifying TFT 154. The source electrode of the signal amplification TFT 154 is electrically connected a power line 351. The gate electrode of the signal amplification TFT 154 is electrically connected to the light-sensitive pickup element 151. The drain electrode of the signal amplification TFT 154 is electrically connected to the output-controlling TFT 155. The source electrode of the output control TFT 155 is electrically connected to the signal amplification TFT 154. The gate electrode of the output control TFT 155 is electrically connected to a selection signal line 353. Finally, the drain electrode of the output control TFT 155 is electrically connected to a readout signal line 6a2.

Upon reception of incident light at the light-sensitive pickup element 151, a photocurrent (i.e., photoelectric current) is generated in the light-sensitive pickup element 151. Then, as each of the reset TFT 163, the voltage amplification TFT (i.e., signal amplification TFT) 154, and the output control TFT 155 turns into an active operation state, a signal having a level that corresponds to a voltage between the power line 352, which is electrically connected to the light-sensitive pickup element 151, and a node "a" (refer to FIG. 5) is outputted through the readout signal line 6a2.

Next, with reference to FIGS. 6-10, an exemplary configuration of the pixel unit 72 is explained below.

As shown in FIG. 6, the pixel unit 72 has the aforementioned three sub pixel units 72R, 72G, and 72B that are arrayed along the X direction. In addition, the pixel unit 72 further has the aforementioned photo-detection circuit unit 250.

These sub pixel units 72R, 72G, and 72B have open regions 73R, 73G, and 73B, respectively. At the time of operation of the liquid crystal device 1, red light, green light, and blue light are transmitted through these open regions 73R, 73G, and 73B, respectively. By this means, the liquid crystal device 1 according to the present embodiment of the invention is capable of displaying a color image. Each of the sub pixel units 72R, 72G, and 72B has the aforementioned TFT 30, which provides a switching control on the sub pixel unit 72R/72G/72B.

The photo-detection circuit unit 250 has the adjustment-controlling TFT 130, an open region 83, and a TFT circuit unit 80. The optical sensor unit (150) detects incident light that enters through the image display surface 302s. The TFT circuit unit 80 is made up of, though not necessarily limited thereto, the reset TFT 163, the signal-amplifying TFT 154, and the output-controlling TFT 155. The TFT circuit unit 80 controls the operation of the light-sensitive pickup element 151, which is exposed at the open region 83. In addition thereto, the TFT circuit unit 80 outputs a voltage change in accordance with a photocurrent that is generated by (i.e., in) the light-sensitive pickup element 151 onto the readout signal line 6a2.

As illustrated in FIGS. 7, 8, and 9, the liquid crystal device 1 according to the present embodiment of the invention has, as the layer components thereof, a light-shielding film 11, another light-shielding film 153, three color types of color filters 154R, 154G, and 154B that are embedded in a planarizing film (i.e., planarization film) 20a, the liquid crystal element 50b, the light-sensitive pickup element 151, the backlight 206, a first polarizing plate 301, the second polarizing plate 302, and the third polarizing plate 303.

The backlight 206 includes an optical waveguide board 206a and a display light source 206b. The backlight 206 is provided under the TFT array substrate 10 as illustrated therein.

The display light source 206b of the backlight 206 generates display light L1, which is used for displaying an image in the image display area 10a of the liquid crystal device 1. The display light L1 is visible light. The liquid crystal layer 50 modulates the display light L1 in accordance with the driving state of each of the sub pixel units 72R, 72G, and 72B.

The optical waveguide board 206a of the backlight 206 is made of, for example, acrylic resin that can transmit the display light L1, though not limited thereto. The optical waveguide board 206a guides the display light L1 toward the image display region 10a of the liquid display device 1. The liquid crystal device 1 according to the present embodiment of the invention utilizes the display light L1 for the purpose of displaying an image in the image display area 10a thereof. In addition, the liquid crystal device 1 according to the present embodiment of the invention utilizes the display light L1 and external light for the purpose of detecting a pointing object F.

Each of the first polarizing plate 301 and the second polarizing plate 302 constitutes a part of the light amount adjustment unit 82. As illustrated in the drawing, the first polarizing plate 301 is provided under/below the liquid crystal element 50b, whereas the second polarizing plate 302 is provided over/above the liquid crystal element 50b. The first polarizing layer (i.e., first polarizing plate) 301 and the second polarizing layer (i.e., second polarizing plate) 302 are arranged in a cross nicol pattern such that the optical axis (i.e., transmission axis) of the first polarizing film thereof and the optical axis of the second polarizing film thereof are orthogonal to each other. The liquid crystal element 50b has a liquid crystal portion that overlaps the light-sensitive pickup element 151 in a plan view, constituting a part of the liquid crystal layer 50. The liquid crystal element 50b further has a first electrode 159a and a second electrode 21a that sandwich the liquid crystal portion thereof.

The light amount adjustment unit 82 functions as an incident-light amount/intensity/level reduction layer structure that adjusts the amount of incident light L2 that goes through the image display surface 302s to enter the open region 83. As has already been explained above while referring to FIG. 5, in the configuration of the liquid crystal device 1 according to the present embodiment of the invention, since the adjustment-controlling TFT 130 can control the alignment/orientation state of liquid crystal (molecule) portion of the liquid crystal element 50b, it is possible to adjust the amount of incident light L2 (L2') that enters the optical sensor unit 150 on an individual basis so that it varies from one (group of) light amount adjustment unit(s) 82 to another (group of) light amount adjustment unit(s) 82. Therefore, as the optical intensity of the display light L1 can be adjusted by controlling the orientation/alignment state of a liquid crystal layer in each pixel, so the amount of incident light L2' that enters the light-sensitive pickup element 151 of each of the optical sensor unit 150 can be adjusted independently of each other (one another).

Therefore, even in a case where the amount of incident light L2 that enters through the image display surface 302s in each of a plurality of (pixel) regions that makes up the image display region 10a does not fall, if not corrected, within a detectable range in which each of the optical sensor units 150 can detect the light amount thereof, the plurality of light amount adjustment units 82 according to an exemplary embodiment of the invention makes it possible to adjust the amount of incident light that actually enters each of the optical sensor units 150 so as to ensure that it falls within the detectable range after the adjustment thereof, where such light-amount adjustment is applied either to each optical sensor unit 150, that is, individually on a sensor-by-sensor basis, or to each group of the optical sensor units 150; herein, each group thereof is made up of a given number of the optical sensor units 150.

In particular, in each of the plurality of (pixel) regions that makes up the image display region 10a, in a case where it is not possible to discriminate a pointing means such as a finger of a user, though not limited thereto, from the background thereof because of a change in any ambient condition factor (s) such as external light that is shut off by the pointing means, or more specifically, for example, in a case where the amount of the incident light L2 that enters through an image region of the image display surface 302s on which the shade of the pointing means is projected and the amount of the incident light L2 that enters through a background region of the image display surface 302s that surrounds the image region thereof do not fall within a detectable range in which the light-sensitive pickup element 151 of the optical sensor unit 150 can detect the light amount thereof because, for example, the optical intensity of external light is too large, which is a non-limiting reason, each of the plurality of light amount adjustment units 82 according to an exemplary embodiment of the invention adjusts the light amount thereof so as to ensure that the amount of the incident light L2 that enters through the image region of the image display surface 302s on which the shade of the pointing means is projected and the amount of the incident light L2 that enters through the background region of the image display surface 302s that surrounds the image region thereof are shifted and thus, after the adjustment, fall within the detectable range in which the light-sensitive pickup element 151 of the optical sensor unit 150 can detect the light amount thereof. That is, each of the plurality of light amount adjustment units 82 according to an exemplary embodiment of the invention functions as an incident-light amount/intensity/level reduction layer structure that adjusts the amount of incident light L2 (L2') that enters each of the optical sensor units 150 on an individual basis so that it varies from one (group of) light amount adjustment unit(s) 82 to another (group of) light amount adjustment unit(s) 82.

Therefore, with the configuration of the liquid crystal device 1 according to the present embodiment of the invention, even in a case where the amount of incident light L2, which enters through the image display surface 302s in each of a plurality of pixel regions that makes up the image display region 10a, does not fall, if not corrected, within a detectable range in which each of the optical sensor units 150 can detect the light amount thereof, the plurality of light amount adjustment units 82 makes it possible to adjust the amount of incident light that actually enters each of the optical sensor units 150 so as to ensure that it falls within the detectable range after the adjustment thereof. As a result thereof, the "light-amount-adjusted" incident light L2' r which is obtained after that the light amount of the incident light L2 has been adjusted into the detectable range by the light amount adjustment unit 82, is irradiated on (i.e., enters, or reaches) the optical sensor unit 150. Accordingly, the liquid crystal device 1 according to the present embodiment of the invention makes it possible to detect (i.e., identify) a pointing means that could not be detected (i.e., identified) if the incident light L2, which enters through the image display surface 302s, reached the optical sensor unit 150 without being subjected to the light-amount adjustment performed by the light amount adjustment unit 82. Thus, the liquid crystal device 1 according to the present embodiment of the invention makes it possible to identify the location of the pointing means on (or over) the image display surface 302s in each of a plurality of pixel regions that makes up the image display region 10a thereof.

In addition, each of the plurality of light amount adjustment units 82 functions as an incident-light amount/intensity/level reduction layer structure that adjusts the amount of incident light L2 (L2') that enters each of the optical sensor units 150 on an individual basis so that it varies from one (group of) light amount adjustment unit(s) 82 to another (group of) light amount adjustment unit(s) 82. Therefore, even under an ambient condition in which the optical intensities of the incident light L2 that includes external light vary from one (pixel) region to another in the image display area 10a, the liquid crystal device 1 according to the present embodiment of the invention makes it possible to selectively adjust the amount of incident light in not all but some of (pixel) regions at which the amount of the incident light L2, which enters through the image display surface 302s, does not fall, if not corrected, within the detectable range in which the corresponding optical sensor units 150 can detect the light amount thereof. Such an area-selective application of the light-amount adjustment according to the present embodiment of the invention ensures an enhanced precision in the detection of a pointing means.

Therefore, unlike an image pickup apparatus such as a camera that has a mechanical incident-light amount/intensity/level reduction structure (e.g., mechanical iris) that is provided in the optical path thereof, the liquid crystal device 1 according to the present embodiment of the invention can adjust the amount of the incident light L2 by utilizing a part of the liquid crystal layer thereof, which has a main function of image display. Thus, the liquid crystal device 1 according to the present embodiment of the invention makes it possible to adjust the amount of the incident light L2 without requiring any dedicated space for such a mechanical incident-light amount/intensity/level reduction structure. Since the liquid crystal device 1 according to the present embodiment of the invention can adjust the amount of the incident light L2 effectively with such an advantageous configuration, it is possible to ensure an enhanced precision in the detection of a pointing means.

The first electrode 159a of the liquid crystal element 50b is formed in the same layer as that of the plurality of pixel electrodes 9a each of which is provided in the corresponding one of the plurality of pixel units 72 that make up the image display region 10a over the TFT array substrate 10. Therefore, in the manufacturing process of the liquid crystal device 1 according to the present embodiment of the invention, it is possible to form the first electrode 159a of the liquid crystal element 50b and the pixel electrode 9a, which is configured as a transparent electro-conductive electrode that is made of a transparent electro-conductive material such as ITO or the like, in the same single electrode formation process, which offers a more simplified and thus efficient production thereof in comparison with a case where the first electrode 159a of the liquid crystal element 50b is manufactured in one electrode formation process whereas the pixel electrode 9a is manufactured in another electrode formation process. On the other hand, the second electrode 21a of the liquid crystal element 50b is configured as a regional portion of the counter electrode 21 that overlaps the light-sensitive pickup element 151 in a plan view.

The first polarizing layer 301 is formed as follows; a solution of water-soluble dichromatic dye (in water) is coated onto the insulating film 42 while a stress is applied/exerted in one direction; then, the coated solution of the dichromatic dye is dried. As a non-limiting modification example thereof, the first polarizing layer 301 may be formed as follows; an orientation/alignment film that is made of a transparent organic material such as polyimide or the like is deposited; thereafter, thermotropic polymer liquid crystal that contains dichromatic dye is coated thereon in such a manner that the coated thermotropic polymer liquid crystal has a predetermined film thickness. In such a modification example, the thermotropic polymer liquid crystal that contains dichromatic dye is coated on the deposited orientation/alignment film by means of a spinner.

Each of the first polarizing layer 301 and the second polarizing layer 302 extends in such a manner that it overlaps the pixel electrodes 9a in a plan view. Each partial region of each of the first polarizing layer 301 and the second polarizing layer 302 that overlaps the corresponding pixel electrode 9a in a plan view functions as a polarizing plate that selectively transmits a linearly polarized component of the display light L1 that is modulated in the image display area 10a thereof. Therefore, in the manufacturing process of the liquid crystal device 1 according to the present embodiment of the invention, it is possible to form a polarizing plate that defines/specifies the transmission amount of the display light L1 for image display and the first polarizing layer 301/second polarizing layer 302 in the same single formation process, which offers a more simplified and thus efficient production thereof in comparison with a case where the polarizing plate that defines/specifies the transmission amount of the display light L1 for image display is manufactured in one formation process whereas the first polarizing layer 301 and the second polarizing layer 302 are manufactured in another formation process.

The liquid crystal device 1 according to the present embodiment of the invention has the third polarizing layer 303. The third polarizing layer 303 has an optical axis that extends along the optical axis of the first polarizing layer 301. When viewed from the optical-sensor-unit (150) side, the third polarizing layer 303 is provided at the TFT-array-substrate (10) side. The third polarizing layer 303 extends in such a manner that it overlaps the pixel electrodes 9a in a plan view. Functioning in cooperation with the partial region of the first polarizing layer 301 that overlaps the pixel electrode 9a in a plan view, the third polarizing layer 303 ensures that the display light L1 that enters each pixel is subjected to linear polarization.

Each of the second polarizing layer 302 and the third polarizing layer 303 is made up of a drawn polyvinyl alcohol (PVA) film and a pair of protective films that is made of cellulose triacetate (i.e., triacetyl cellulose, TAC), where the drawn PVA film is sandwiched between one TAC protective film and the other.

As illustrated in FIGS. 7, 8, and 9, the sub pixel unit 73R displays, among all three color components of modulated light, which is obtained as a result of optical modulation of the display light L1 performed by the liquid crystal layer 50, red light through the red color filter 154, which can transmit red light. In the same manner as done by the red sub pixel unit 73R, the green sub pixel unit 73G displays green light L1G via the green color filter 154G, whereas the blue sub pixel unit 73B displays blue light L1B via the blue color filter 154B.

In a plan view, the light-sensitive pickup element 151 is formed over the TFT array substrate 10 in such a manner that it is exposed at the open region 83. The light-sensitive pickup element 151 is formed on the insulating film 41 that is deposited over the TFT array substrate 10. The insulating film 42 covers the light-sensitive pickup element 151.

The light-sensitive pickup element 151 is a photo-detection device. An example of the photo-detector 151 includes but not limited to a PIN diode that uses a semiconductor made of crystalline silicon, GaAs, or the like that is formed in the same process as the formation of a semiconductor element such as a TFT of the TFT circuit unit 80 or the like. Another non-limiting example of the light-sensitive pickup element 151 is a photoelectric conversion element made of PbS. The light-sensitive pickup element 151 detects the incident light L21, which is obtained after that the incident light L2 has been subjected to light-amount adjustment performed by the light amount adjustment unit 82.

As illustrated in FIGS. 7 and 8, the light-shielding film 153 is configured as a so-called black matrix, which defines at least a portion of the edge of an open region. Thanks to the presence of the black-matrix light-shielding film 153, it is possible to prevent the visible light L2 that enters through the image display surface 302s from irradiating (i.e., entering, or reaching) some semiconductor elements such as the pixel-switching TFT 30 and the like and other semiconductor elements provided in the TFT circuit unit 80, which are formed in a non-open region. Therefore, the black-matrix light-shielding film 153 makes it possible to significantly reduce an optical leakage current that could occur in the above-mentioned some semiconductor elements such as the pixel-switching TFT 30 and the like and the above-mentioned other semiconductor elements that are formed in the TFT circuit unit 80.

As understood from FIGS. 6-9, the optical sensor unit 150 is formed in a non-open region that isolates one open region from another open region in the layout of the plurality of pixel units 72 arrayed adjacent to one another over the TFT array substrate 10. In the configuration of the liquid crystal device 1 according to the present embodiment of the invention, the display light L1R, L1G, and L1B are outputted through the open regions 73R, 73G, and 73B, respectively. Therefore, the presence of the optical sensor unit 150 does in no case shut off these display light L1R, L1G, and L1B.

The liquid crystal device 1 according to the present embodiment of the invention is provided with the light-shielding film 11, which is formed below/under the light-sensitive pickup element 151 on the TFT array substrate 10. The light-shielding film 11 is made of a material having a light-shielding property such as a metal film or the like. The light-shielding film 11 blocks the visible light L1 so that the display light L1, which has been emitted from the backlight 206, should not reach the light-sensitive pickup element 151. Therefore, thanks to the presence of the light-shielding film 11, it is possible to reduce an adverse possibility of the malfunctioning operation of the light-sensitive pickup element 151 that could occur due to the irradiation of the display light L1 onto the light-sensitive pickup element 151. The light-shielding film 11 can be formed in the same layer as that of a part of other elements/components that are formed on the TFT array substrate 10 or other light-shielding film such as an electro-conductive film that constitutes wirings, though not limited thereto, in the same single formation process.

The light-shielding film 11 extends on the TFT array substrate 10 in such a manner that it overlaps the TFT circuit unit 80 and the pixel-switching TFT 30 in a plan view. Having such a configuration, the light-shielding film 11 is capable of blocking the display light L1 so that it does not reach not only the light-sensitive pickup element 151 but also the TFT circuit unit 80 and the pixel-switching TFT 30, thereby reducing an adverse possibility of the malfunctioning operation of not only the light-sensitive pickup element 151 but also the TFT circuit unit 80 and the pixel-switching TFT 30.

Next, with reference to FIG. 10, the layer configuration of the photo-detection circuit unit 250 is explained in detail below.

As illustrated in FIG. 10, the adjustment-controlling TFT 130 has a semiconductor layer 1a, contact holes 181 and 182, a source electrode 91, a drain electrode 92, and a gate electrode 3a1.

The semiconductor layer 1a of the adjustment-controlling TFT 130 is configured as, for example, a low-temperature polysilicon layer, though not necessarily limited thereto. The semiconductor layer 1a is made up of a channel region 1a', a source region 1b', and a drain region 1c'. The channel region 1a, of the semiconductor layer 1a overlaps the gate electrode 3a1 in a plan view. At the time of the operation of the adjustment-controlling TFT 130, an electric field is applied/exerted from the gate electrode 3a1, which is electrically connected to the scanning line 3a, to the channel region 1a' of the semiconductor layer 1a. As a result thereof, a channel is formed at the channel region 1a' thereof. A regional portion of a sub insulating film 42a, which constitutes a part of the insulating film 42, functions as the gate insulating film of the adjustment-controlling TFT 130. Specifically, a regional portion thereof that is interposed between the gate electrode 3a1 and the semiconductor layer 1a constitutes the gate insulating film of the adjustment-controlling TFT 130. Each of the source region 1b' and the drain region 1c' is formed adjacent to the channel region 1a' in such a manner that the source region 1b' and the drain region 1c' forms a mirror pattern (i.e., symmetry pattern).

The gate electrode 3a1 is made of an electro-conductive film such as a conductive polysilicon film. Or, alternatively, the gate electrode 3a1 may be made of an elemental metal, an alloy, a metal silicide, a polysilicide, or any lamination thereof, which contains at least one of a metal including but not limited to titanium (Ti), chromium (Cr), tungsten (W), tantalum (Ta), molybdenum (Mo), palladium (Pd), and aluminum (Al). The gate electrode 3a1 is formed at a region that overlaps the channel region 1a' of the semiconductor layer 1a in a plan view with the insulating film 42a being interposed therebetween. It should be noted that the gate electrode 3a1 is formed in such a manner that it does not overlap the source region 1*b* and the drain region 1*c* at all in a plan view.

As a non-limiting modification example thereof, the adjustment-controlling TFT 130 may have a lightly doped drain (LDD) structure. In such a modified configuration, a lightly doped source region is formed between the source region 1*b*, and the channel region 1*a*, whereas a lightly doped drain region is formed between the drain region 1*c'* and the channel region 1*a'*.

Each of the contact holes 181 and 182 is formed to penetrate through the sub insulating films 42*a* and 42*b*, each (and a combination) of which constitutes a part of the insulating film 42. The bottom of each of the contact holes 181 and 182 faces the semiconductor layer 1*a* of the adjustment-controlling TFT 130. Specifically, the contact hole 181 is bored through the sub insulating films 42*a* and 42*b* to reach the source region 1*b'* at the bottom thereof. On the other hand, the contact hole 182, which is also bored through the sub insulating films 42*a* and 42*b*, reaches the drain region 1*c'* at the bottom thereof. The source electrode 91 is formed on the sub insulating film 42*b* and extends inside the contact hole 181. The source electrode 91 is electrically connected to the source region 1*b'* of the semiconductor layer 1*a*. On the other hand, the drain electrode 92, which is also formed on the sub insulating film 42*b*, extends inside the contact hole 182. The drain electrode 92 is electrically connected to the drain region 1*c'* of the semiconductor layer 1*a*. The sub insulating film 42*c*, which constitutes another sub-layer portion of the insulating film 42, covers each of the source electrode 91 and the drain electrode 92. The drain electrode 92 is electrically connected to the first electrode 159*a* of the liquid crystal element 50*b* via another contact hole as illustrated in the drawing.

The light-sensitive pickup element 151 has a semiconductor layer 150*a*, contact holes 183 and 184, and electrodes 93 and 94. The semiconductor layer 150*a* of the light-sensitive pickup element 151 is made up of an N-type semiconductor layer 150*b*1, a P-type semiconductor layer 150*c'*, and an intermediate layer 150*a'*. Each of the N-type semiconductor layer 150*b'*, the P-type semiconductor layer 150*c*1, and the intermediate layer 150*a'* is formed on the insulating layer 41. The intermediate layer 150*a'* is interposed between the N-type semiconductor layer 150*b'* and the P-type semiconductor layer 150*c'*. The intermediate layer 150*a'* has a relatively large electric resistance in comparison with those of the N-type semiconductor layer 150*b'* and the P-type semiconductor layer 150*c'*. Each of the contact holes 183 and 184 is formed to penetrate through the sub insulating films 42*a* and 42*b*, each (and a combination) of which constitutes a part of the insulating film 42. The bottom of each of the contact holes 183 and 184 faces the semiconductor layer 150*a* of the light-sensitive pickup element 151. Specifically, the contact hole 183 is bored through the sub insulating films 42*a* and 42*b* to reach the N-type semiconductor layer 150*b'* at the bottom thereof. On the other hand, the contact hole 184, which is also bored through the sub insulating films 42*a* and 42*b*, reaches the P-type semiconductor layer 150*c'* at the bottom thereof. One electrode 93 of the light-sensitive pickup element 151 is formed on the sub insulating film 42*b* and extends inside the contact hole 183. This electrode 93 is electrically connected to the N-type semiconductor layer 150*b'* of the semiconductor layer 150*a*. On the other hand, the other electrode 94, which is also formed on the sub insulating film 42*b*, extends inside the contact hole 184. This electrode 94 is electrically connected to the P-type semiconductor layer 150*c'* of the semiconductor layer 150*a*.

When external light and reflected light L2, which is obtained as a result of the reflection of the display light L1R, L1G, and L1B at the pointing means, are irradiated on the semiconductor layer 150*a* of the light-sensitive pickup element 151, an electric current flows in the light-sensitive pickup element 151 in accordance with the optical intensity of the light irradiated thereon. A received-light signal that is processed by the aforementioned received-light signal processing circuit unit 215 shown in FIG. 3 is a signal corresponding to a voltage change that occurs in accordance with a photocurrent that flows in the light-sensitive pickup element 151. As the received-light signal processing circuit unit 215 and the image processing circuit unit 216 perform the signal processing of the received-light signal in a sequential manner, the location, though not necessarily limited thereto, of the pointing object (pointing means) that points to the image display surface 302*s* is identified. By this means, the liquid crystal device 1 according to the present embodiment of the invention allows various kinds of information to be inputted therein by means of the pointing object.

The reset TFT 163, which is a component of the TFT circuit unit 80, is made up of a semiconductor layer 160*a*, contact holes 161 and 162, a source electrode 164, a drain electrode 165, and a gate electrode 163*a*. The semiconductor layer 160*a* of the reset TFT 163 is made up of a channel region 160*a'*, a source region 160*b'*, and a drain region 160*c'*. The reset TFT 163 is electrically connected to the light-sensitive pickup element 151 via a wiring that is not shown in the drawing.

Figure 11:
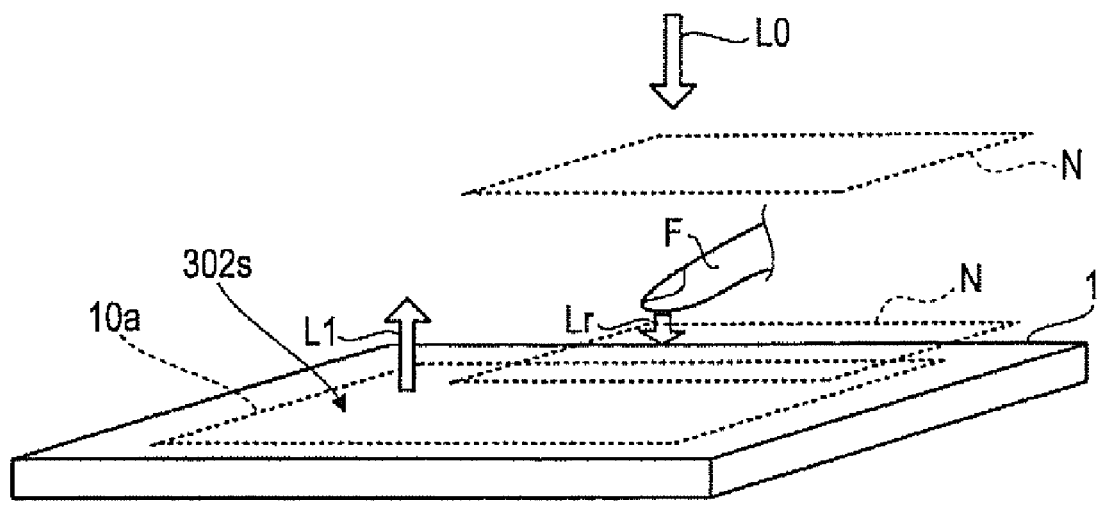
FIG. 11 is a perspective view that schematically illustrates an example of a pointing means, which points to the display surface thereof shown together with a liquid crystal device according to an exemplary embodiment of the invention.
Figure 12A:
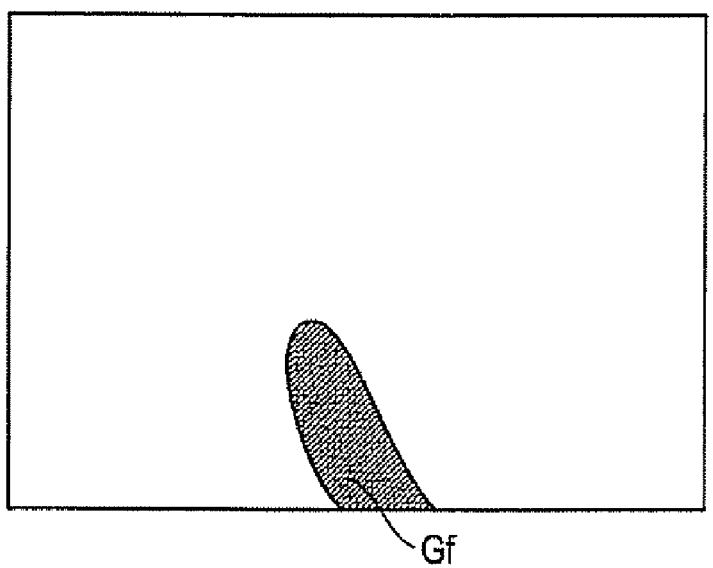
FIGS. 12A and 12B is a set of concept diagrams that schematically illustrates two examples of images in each of which the target-image region of a pointing means can be discriminated from other non-target-image region.
Figure 12B:
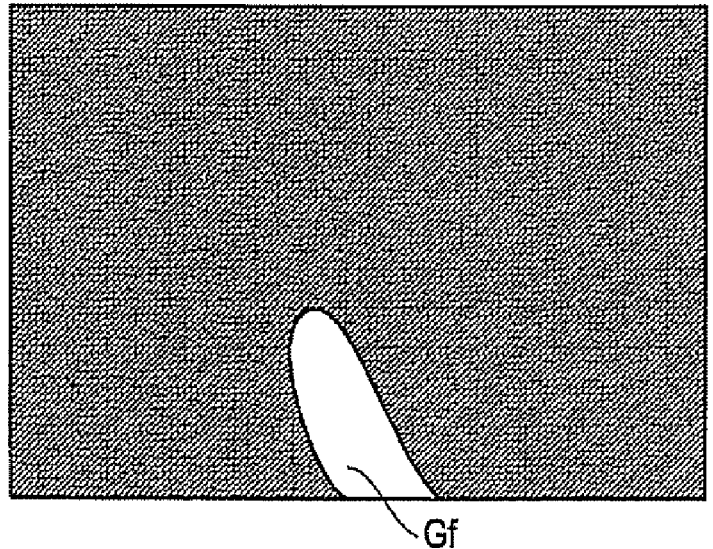
Figure 13A:
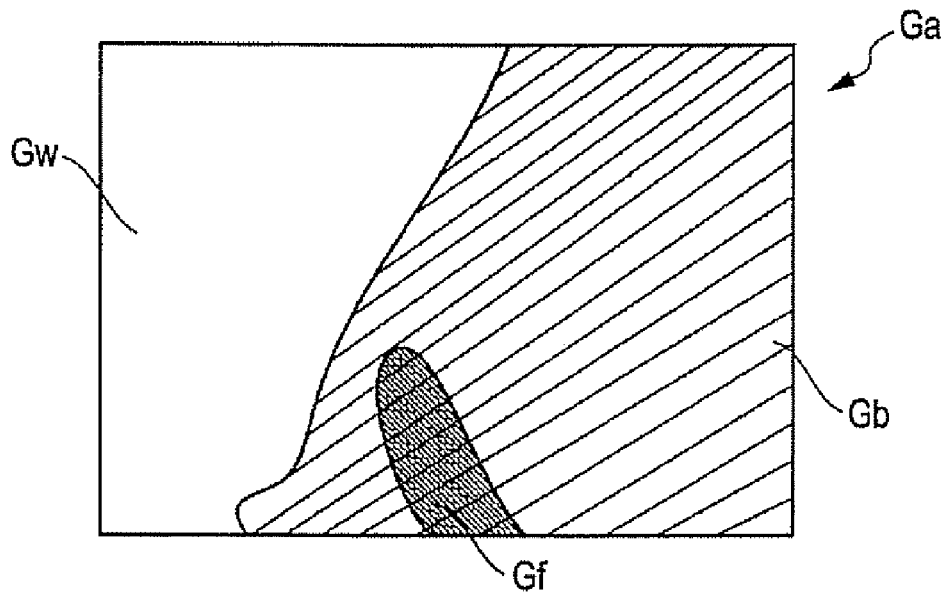
FIGS. 13A and 13B is a set of concept diagrams that schematically illustrates two examples of images in each of which the target-image region of a pointing means cannot be discriminated from other non-target-image region.
Figure 13B:
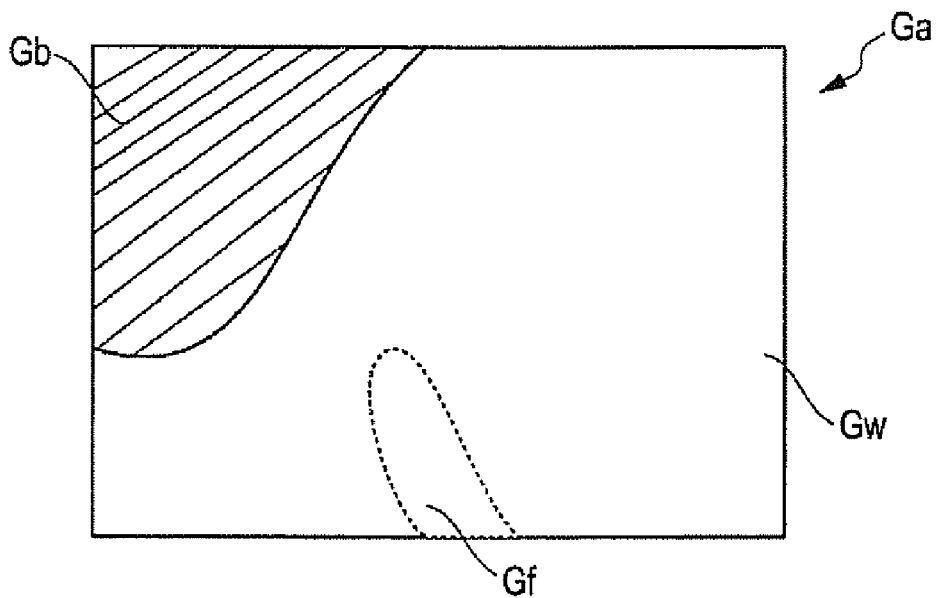

Next, with reference to FIGS. 11, 12, and 13, the functions of the light amount adjustment unit 82 and the optical sensor unit 150 according to an exemplary embodiment of the invention are explained in detail below. FIG. 11 is a perspective view that schematically illustrates an example of a pointing means F, which points to the image display surface 302*s*, shown together with the liquid crystal device 1 according to an exemplary embodiment of the invention. FIGS. 12A and 12B is a set of concept diagrams that schematically illustrates two examples of images in each of which the target-image region (i.e., target-image portion) of a pointing means can be discriminated (i.e., distinguished, or identified) from other non-target-image region (e.g., background portion). FIGS. 13A and 13B is a set of concept diagrams that schematically illustrates two examples of images in each of which the target-image region of a pointing means cannot be discriminated from other non-target-image region. FIGS. 14A and 14B is a set of concept diagrams that schematically illustrates two examples of images that have been subjected to correction processing according to an exemplary embodiment of the invention, which is performed in such a manner that each of the plurality of light amount adjustment units adjusts the amount of incident light on an individual basis; and therefore, as a result of such correction processing unique to the invention, the target-image region of a pointing means can be discriminated from other non-target-image region. FIG. 15 is a graph that shows an example of the relationship between the amount of incident light that can be detected by the optical sensor unit 150 and a voltage at the terminals of the light-sensitive pickup element 151.

First of all, with reference to FIGS. 11 and 12, an explanation is given below of examples of images in each of which the target-image region of a pointing means F, which points to the image display surface 302*s* of the liquid display device 1, can be discriminated from other non-target-image region. It should be noted that, in the following description, the incident light L2 refers to not only external light L0 but also reflected light Lr, which is light obtained as a result of the reflection of the display light L1 at (i.e., by) the pointing means F. That is, the incident light L2 includes both the external light L0 and the reflected light Lr.

As illustrated in FIGS. 11 and 12A, in a case where the pointing means F shields external light L0 that propagates toward the image display surface 302s under the conditions that the optical intensity of the external light L0 is large, the liquid crystal device 1 acquires an image Ga that includes a target-image portion Gf that corresponds to the shade of the pointing means F. Specifically, for example, one group of the optical sensor units 150 that is arrayed in a "pointing-means-overlapping" region of the image display area 10a (i.e., one group of the optical sensor units 150 that is provided in a partial region thereof at which the pointing means F overlap), which can be paraphrased as one group of the optical sensor units 150 that is provided in a partial region thereof on which the shade of the pointing means F is projected, detects the amount of incident light L2 that corresponds to the shade of the pointing means F. On the other hand, the other group of the optical sensor units 150 that is arrayed in the remaining region thereof at which the pointing means F does not overlap detects the amount of incident light L2 while taking the external light L0 that is not shut off by the pointing means F as the incident light L2. Since the amount of the incident light L2 that is detected by the former group of the optical sensor units 150, which is arrayed in the partial region of the image display area 10a at which the pointing means F overlap, differs from the amount of the incident light L2 that is detected by the latter group of the optical sensor units 150, which is arrayed in the remaining region of the image display area 10a at which the pointing means F does not overlap, the target-image portion Gf, which corresponds to the pointing means F, of the acquired image Ga constitutes a dark image area whereas the remaining non-target-image portion of the acquired image Ga constitutes a bright image area in accordance with the difference in the amount of light therebetween.

On the other hand, as illustrated in FIGS. 11 and 12B, under the conditions that the external light L0 is weak, the display light L1 that has gone out through the image display surface 302s is reflected by the pointing means F. Then, the optical sensor unit 150 detects the reflected light Lr. In such a case, the target-image portion Gf, which corresponds to the pointing means F, of the acquired image Ga constitutes a relatively bright image area whereas the remaining non-target-image portion of the acquired image Ga constitutes a relatively dark image area in accordance with the difference in the amount of light therebetween. Accordingly, the target-image region Gf of the pointing means F, which points to the image display surface 302s of the liquid display device 1, can be discriminated from the remaining non-target-image region.

In the above-described examples of optical conditions, the liquid crystal device 1 successfully acquires the image Ga that contains the target-image portion Gf corresponding to the pointing means F that points to the image display surface 302s of the liquid display device 1 in such a manner that the target-image portion Gf can be discriminated from the remaining non-target-image region on the basis of the difference in the amount of the incident light L2 that is detected by the plurality of optical sensor units 150 thereof. Under such an assumption, it is possible to identify the location, though not necessarily limited thereto, of the pointing means F, which lies on/over the image display surface 302s thereof. By this means, it is possible for a user to input various kinds of information via the image display surface 302s of the liquid crystal device 1 by means of the pointing object F.

Next, with reference to FIGS. 11 and 13, an explanation is given below of examples of images in each of which the target-image region of the pointing means F, which points to the image display surface 302s of the liquid display device (1), cannot be discriminated from other non-target-image region on the basis of the difference in the amount of the incident light L2 detected by the optical sensor units 150.

First of all, as illustrated in FIG. 11, it is assumed that other object N that is not the pointing object F, which may be hereafter referred to as the noise portion N or simply as the noise N, overlaps the pointing means F over the image display surface 302s of the liquid crystal device (1). Under such an assumption, as illustrated in FIG. 13a, if the external light L0 is strong, that is, has a large optical intensity, a black image region (i.e., black image portion) Gb, which is the shade of the noise portion N, overlaps the target-image region Gf, which is the shade of the pointing means F, in the acquired image Ga1. In such a case, it is not possible to discriminate the target-image region Gf of the pointing means F from other non-target-image region corresponding to the noise N on the basis of the difference in the amount of the incident light L2 therebetween. In such a case, it is not possible to identify the location of the pointing means F, which lies on/over the image display surface 302s of the liquid crystal device (1). Therefore, it is not possible for a user to input various kinds of information via the image display surface 302s thereof precisely by means of the pointing object F.

Next, with reference to FIG. 13B, an explanation is given below of another example of an acquired image in which the target-image region Gf of the pointing means F cannot be discriminated from other non-target-image region under an assumption that the noise N does not overlap the pointing object F and that the optical intensity of the external light L0 is large. As illustrated in FIG. 13B, if the external light L0 is too strong, the target-image region Gf that corresponds to the pointing means F overlaps a white image region (i.e., white image portion) Gw, which is relatively bright in comparison with the target-image region Gf of the pointing means F in an acquired image Ga2. Accordingly, in the acquired image Ga2, even under the conditions that the noise portion N does not overlap the pointing means F, it is not possible to discriminate the target-image region Gf of the pointing means F from other non-target-image region on the basis of the difference in the amount of the incident light L2 therebetween. Therefore, in such a case, it is not possible to identify the location of the pointing object F.

In the illustrated examples of FIGS. 13A and 13B, it is assumed to be known in advance that the target-image region Gf corresponding to the pointing means F overlaps the black image region Gb (in the case of FIG. 13A) or the white image region Gw (in the case of FIG. 13B). However, in the actual use environment of the liquid crystal device (1), it is not possible to make such a predetermination as to whether the target-image region Gf corresponding to the pointing means F overlaps the black image region Gb or the target-image region Gf corresponding to the pointing means F overlaps the white image region Gw.

With reference to FIG. 15, the reason why it is not possible to discriminate the target-image region Gf of the pointing means F from other non-target-image region in the acquired image is explained below.

As illustrated in FIG. 15, which shows the characteristics of the optical sensor unit 150, as the amount of the incident light L2 that enters the light-sensitive pickup element 151 increases, a voltage V applied/detected between the terminals (i.e., the node "a" and the power line 352) of the light-sensitive pickup element 151 decreases. The acquired image Ga is made up of image data that contains information on gradation levels identified in accordance with the voltages V detected at the respective optical sensor units 150.

Accordingly, if the incident light L2 having a light amount that does not fall within the effective detection range of the optical sensor unit 150 enters the optical sensor unit 150, or in other words, if the incident light L2 having a light amount that exceeds the maximum limit P1, which defines an effective light-amount range within which the optical sensor unit 150 can successfully output the voltage V in accordance with the amount of the incident light L2 that is irradiated thereon, enters the optical sensor unit 150, all of image regions that corresponds to some optical sensor units 150 that detect the incident light L2 that has the light amount exceeding the light-amount limit P1 constitute the white image region Gw. As a result thereof, the aforementioned technical problem arises. That is, it is not possible to discriminate the target-image region Gf of the pointing means F from other non-target-image region on the basis of the difference in the amount of the incident light L2 therebetween. Therefore, in such a case, it is not possible to identify the location of the pointing object F. This problem also holds true (i.e., arises) in a case where the target-image region Gf of the pointing means F is contained in the black image region Gb because the other portion N overlaps the pointing object F over the image display surface 302s.

In order to provide a technical solution to such a problem of the related art, though not necessarily limited thereto, in a case where it is not possible to discriminate the target-image region Gf of the pointing means F from other non-target-image region, and thus, in a case where it is not possible to identify the location of the pointing object F in the acquired image Ga, which is obtained as a result of the detection of the incident light L2 performed by each of the plurality of the optical sensor units 150, in the configuration of the liquid crystal device 1 according to an exemplary embodiment of the invention, the aforementioned controlling circuit unit 201 illustrated in FIG. 1 commands one group of the light amount adjustment units 82 that corresponds to the white image region Gw contained in the acquired image Ga to increase the "incident-light shielding amount" (e.g., incident-light intensity reduction amount), whereas the controlling circuit unit 201 commands the other group of the light amount adjustment units 82 that corresponds to the black image region Gb contained in the acquired image Ga to decrease the incident-light shielding amount. In this way, the controlling circuit unit 201 controls the plurality of light amount adjustment units 82 independently of one another.

Specifically, as illustrated in FIG. 14A, the controlling circuit unit 201 of the liquid crystal device 1 according to the present embodiment of the invention performs light-amount control so as to decrease the incident-light intensity reduction amount of the group of the light amount adjustment units 82 that are arrayed in an area corresponding to the black image region Gb in the image display area 10a over the TFT array substrate 10 thereof, which results in an increase in the amount of the incident light L2 that enters the optical sensor units 150 that are arrayed in this area. By this means, an image region Gb1 that has a gradation level higher than that of the black image region Gb is generated. Concurrently therewith, the controlling circuit unit 201 of the liquid crystal device 1 according to the present embodiment of the invention performs light-amount control so as to increase the incident-light intensity reduction amount of the group of the light amount adjustment units 82 that are arrayed in an area corresponding to the white image region Gw in the image display area 10a over the TFT array substrate 10 thereof, which results in a decrease in the amount of the incident light L2 that enters the optical sensor units 150 that are arrayed in this area. By this means, an image region Gw1 that has a gradation level lower than that of the white image region Gw is generated. By this means, it is possible to ensure that the incident light L2 having a light amount that does not exceed the maximum limit P1, which defines the effective detection range of the optical sensor unit 150, enters the optical sensor unit 150. Such a unique configuration of the liquid crystal device 1 according to the present embodiment of the invention makes it possible to "fine-set" the gradation levels of the target-image region Gf that corresponds to the shade of the pointing means F. Non-limiting examples of the fine-set target-image regions having finer gradations are denoted as Gf1, Gf2, and Gf3 in FIG. 14A. With such a configuration, the liquid crystal device 1 according to the present embodiment of the invention makes it possible to identify the location of the pointing means F on/over the image display surface 302s on the basis of (i.e., by referring to) the fine-set target-image region G3 having the lowest gradation level among them.

Similarly, as illustrated in FIG. 14B, the controlling circuit unit 201 of the liquid crystal device 1 according to the present embodiment of the invention performs light-amount control so as to increase the incident-light intensity reduction amount of the group of the light amount adjustment units 82 that are arrayed in an area corresponding to the white image region Gw in the image display area 10a over the TFT array substrate 10 thereof, which results in a decrease in the amount of the incident light L2 that enters the optical sensor units 150 that are arrayed in this area. By this means, the liquid crystal device 1 according to the present embodiment of the invention makes it possible to fine-set the gradation levels of the target-image region Gf that corresponds to the pointing means F, specifically as fine-set target-image regions having finer gradations that are denoted as Gf1, Gf2, and Gf3 in FIG. 14B. With such a configuration, the liquid crystal device 1 according to the present embodiment of the invention makes it possible to identify the location of the pointing means F on/over the image display surface 302s by referring to the position of the fine-set target-image region G3.

In addition thereto, the liquid crystal device 1 according to the present embodiment of the invention is capable of operating the group of the light amount adjustment units 82 that corresponds to the white image portion Gw and the group of the light amount adjustment units 82 that corresponds to the black image portion Gb independently of each other. Therefore, the liquid crystal device 1 according to the present embodiment of the invention is capable of adjusting the amount of the incident light L2 on an individual basis, varying from one region of the image display area 10a thereof to another region thereof. Therefore, even in a case where it is not possible to make a predetermination as to whether the target-image region Gf corresponding to the pointing means F is contained in the black image region Gb or the white image region Gw, the liquid crystal device 1 according to the present embodiment of the invention makes it possible to identify the location of the pointing means F on/over the image display surface 302s thereof.

As explained above, with the configuration of the liquid crystal device 1 according to the present embodiment of the invention, even in a case where the use environment in which the liquid crystal device 1 is operated changes, which is affected by ambient conditions such as the optical intensity of external light, and/or the presence of a noise, though not limited thereto, it is possible for a user to input a variety of kinds of information into the liquid crystal device 1 having a touch-panel function accurately by means of a pointing object such as a finger of the user, though not limited thereto, without generating any insensitive region at which it is not possible to detect the pointing means.

VARIATION EXAMPLE 1

Figure 16:
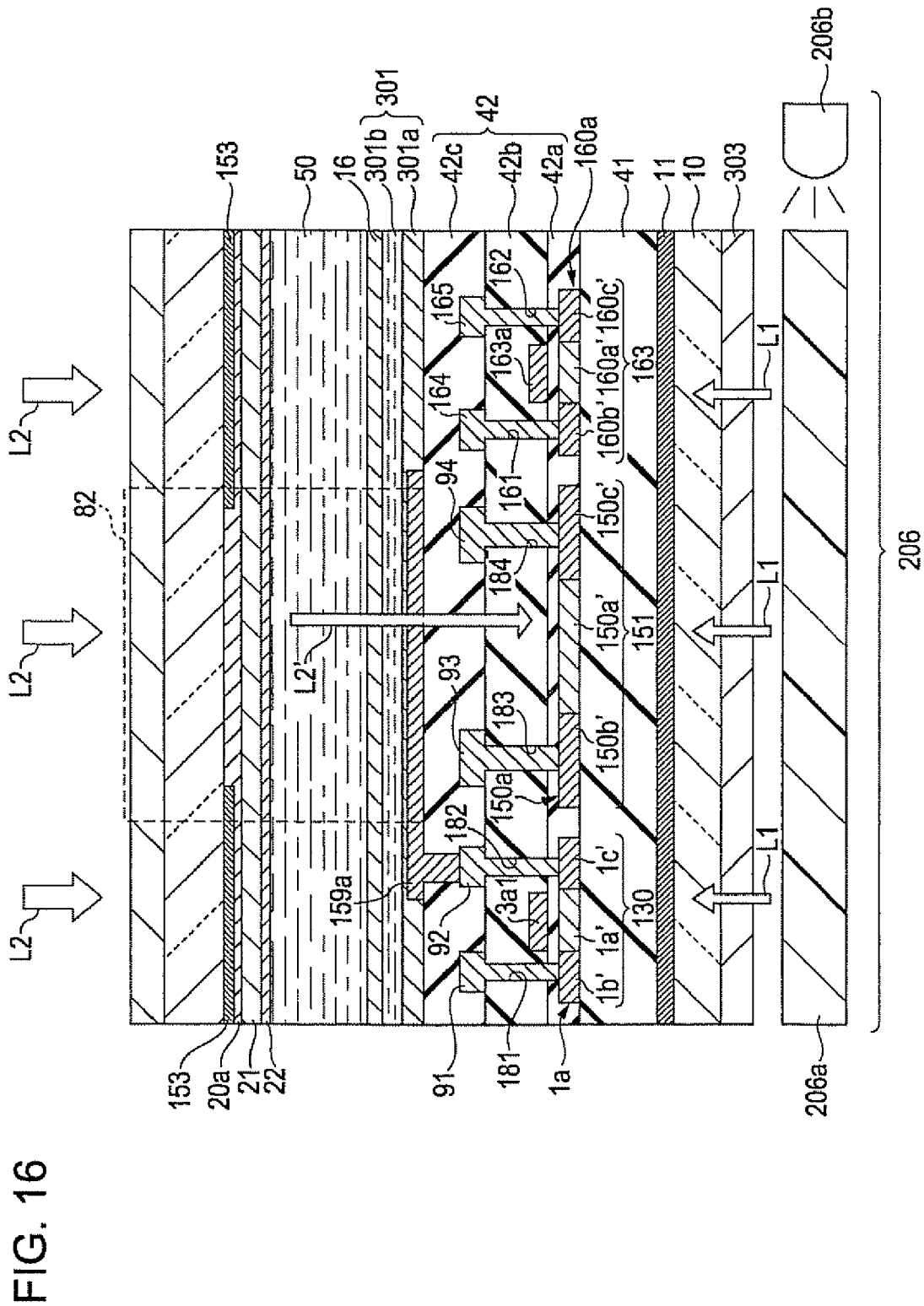
FIG. 16 is a sectional view that corresponds to the sectional view illustrated in FIG. 10, where this drawing schematically illustrates a variation example of the layer configuration of a liquid crystal device according to an exemplary embodiment of the invention.

Next, with reference to FIG. 16, a non-limiting variation example of the liquid crystal device 1 is explained in detail below. FIG. 16 is a sectional view that corresponds to the sectional view illustrated in FIG. 10, where this drawing schematically illustrates a variation example of the layer configuration of the liquid crystal device 1 according to an exemplary embodiment of the invention. In the following description of non-limiting variation examples of the invention, the same reference numerals are assigned to the same components as those of the liquid crystal device 1 described above, and detailed explanation thereof is omitted.

As illustrated in FIG. 16, in the configuration of a liquid crystal device according to this variation example of the invention, the first polarizing layer 301 is formed on the first electrode 159a of the liquid crystal element 50b. Assuming that thermotropic polymer liquid crystal that contains dichromatic dye is used for the first polarizing layer 301, the liquid crystal device according to this variation example of the invention has a lamination structure that includes a polarizing-layer alignment layer (i.e., an orientation layer that is provided for a polarizing layer) 301a and a dichromatic-dye thermotropic polymer liquid crystal layer 301b. In such a lamination structure, the dichromatic-dye thermotropic polymer liquid crystal layer 301b is deposited on the polarizing-layer alignment layer 301a. Electric field that controls the liquid crystal layer 50 is applied thereto via the first polarizing layer 301. In the formation processes of the liquid crystal device according to this variation example of the invention, the first polarizing layer 301 is deposited after the formation of the first electrode 159a. Therefore, it is possible to avoid any heat generated at the time of the formation of the first electrode 159a from adversely affecting the first polarizing layer 301. For this reason, it is possible to ensure excellent optical polarization.

VARIATION EXAMPLE 2

Figure 17:
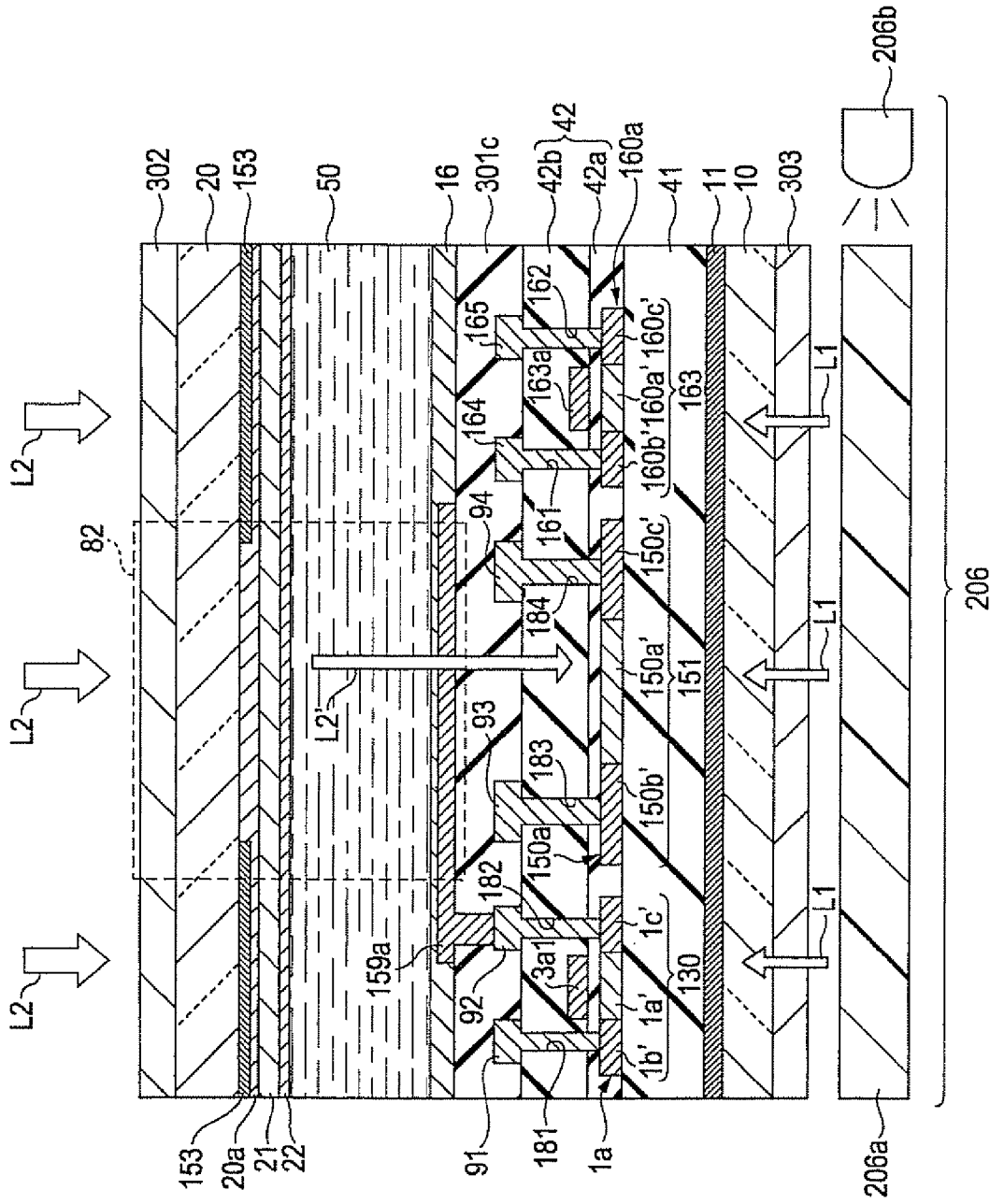
FIG. 17 is a sectional view that corresponds to the sectional view illustrated in FIG. 10, where this drawing schematically illustrates another variation example of the layer configuration of a liquid crystal device according to an exemplary embodiment of the invention.

Next, with reference to FIG. 17, another non-limiting variation example of the liquid crystal device 1 is explained in detail below. FIG. 17 is a sectional view that corresponds to the sectional view illustrated in FIG. 10, where this drawing schematically illustrates another variation example of the layer configuration of the liquid crystal device 1 according to an exemplary embodiment of the invention.

As illustrated in FIG. 17, a liquid crystal device according to this variation example of the invention has a first polarizing layer 301c. The first polarizing layer 301c of the liquid crystal device according to this variation example of the invention is formed on the sub insulating film 42b of the insulating film 42. The thickness of the first polarizing layer 301c is within a range from 1 to 5 μm. In addition to its original function, the first polarizing layer 301c has an additional function as a planarizing insulation layer that isolates the reset TFT 163 and the adjustment-controlling TFT 130 from the first electrode 159a of the liquid crystal element 50b.

2: Image Sensor

Figure 18:
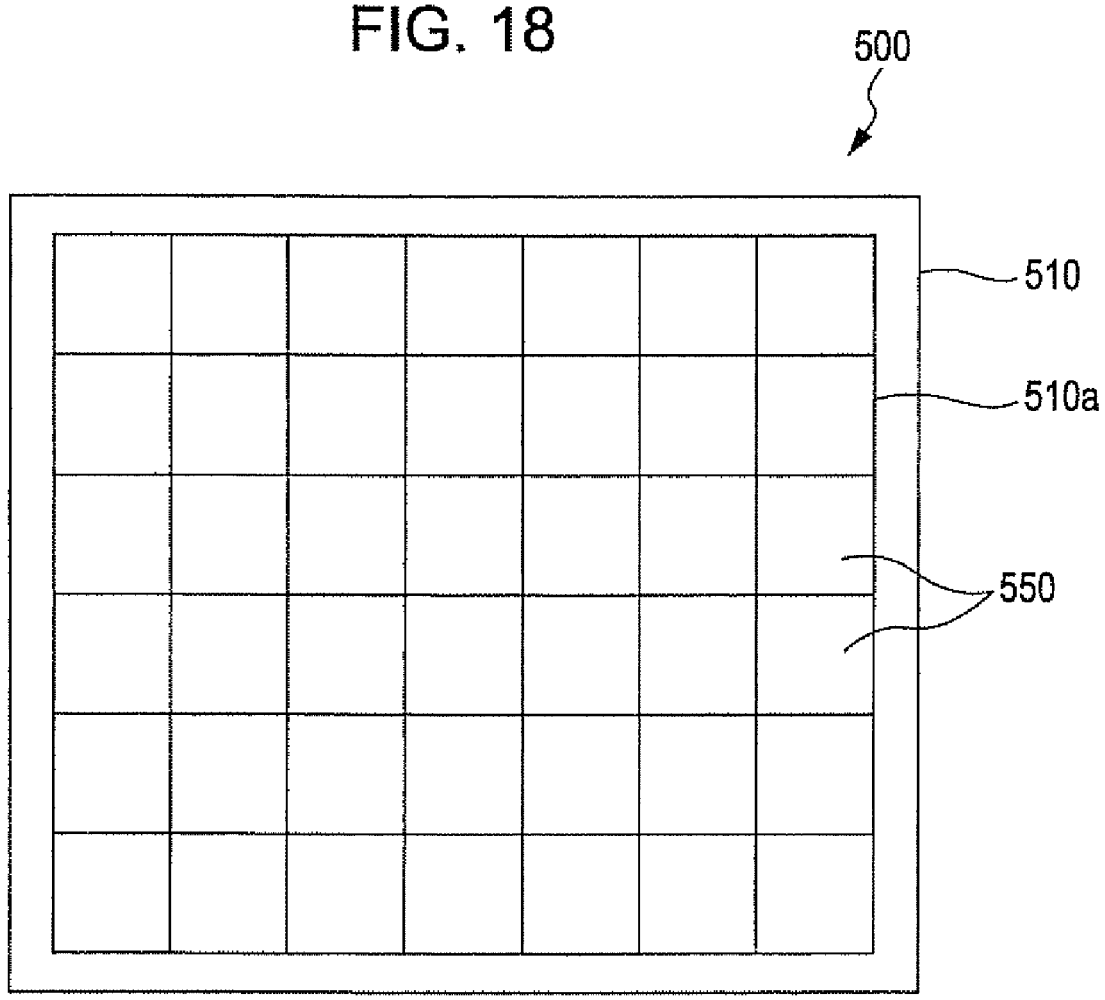
FIG. 18 is a plan view that schematically illustrates an example of the configuration of an image sensor according to an exemplary embodiment of the invention.
Figure 19:
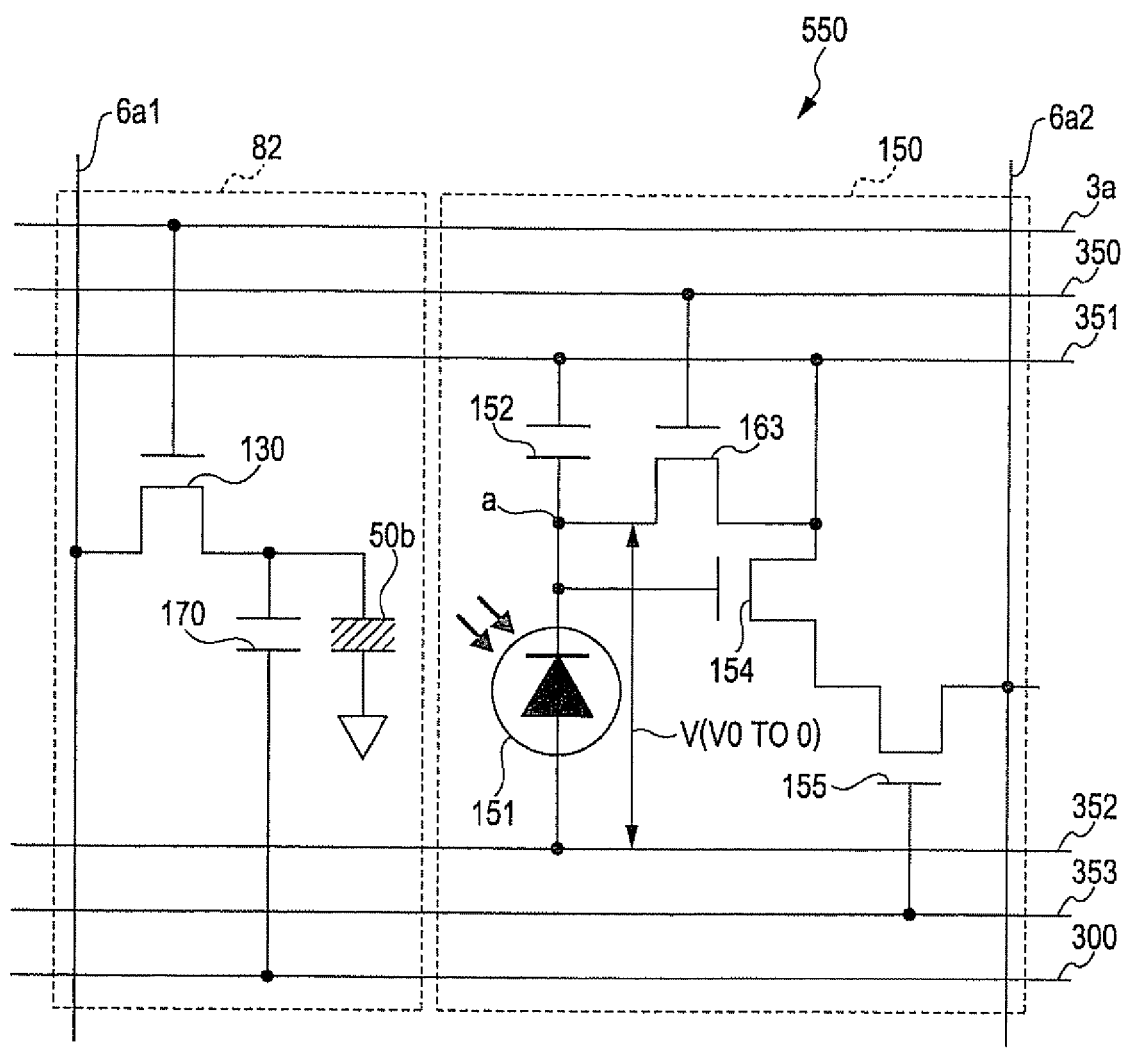
FIG. 19 is a circuit diagram that illustrates, in a close-up view, an example of the electric configuration of one of a plurality of photo-detection circuit units that constitutes an image detection area of an image sensor according to an exemplary embodiment of the invention.

Next, with reference to FIGS. 18 and 19, an explanation is given below of the configuration of an image sensor according to an exemplary embodiment of the invention. FIG. 18 is a plan view that schematically illustrates an example of the configuration of an image sensor according to an exemplary embodiment of the invention. FIG. 19 is a circuit diagram that illustrates, in a close-up view, an example of the electric configuration of one of a plurality of photo-detection circuit units that constitutes an image detection area of an image sensor according to the present embodiment of the invention. In the following description, the same reference numerals are assigned to the same components as those of the liquid crystal device 1 described above, and detailed explanation thereof is omitted.

As shown in FIG. 18, an image sensor 500 according to the present embodiment of the invention has a substrate 510 and a plurality of photo-detection circuit units 550. Various kinds of circuit units that are made up of semiconductor elements are formed on the substrate 510. The plurality of photo-detection circuit units 550 is formed in the image detection area 510a of the substrate 510.

As shown in FIG. 19, similar to the configuration of the photo-detection circuit unit 250 of the liquid crystal device 1 described above, the photo-detection circuit unit 550 of the image sensor 500 is provided with the light amount adjustment unit 82 and the optical sensor unit 150. The light amount adjustment unit 82 is included in each of the plurality of photo-detection circuit units 550. The plurality of light amount adjustment units 82 is capable of operating independently of each other (one another) in the image detection region 510a so as to adjust the amount of incident light that enters each of the plurality of the optical sensor units 150. Therefore, as the liquid crystal device 1 according to the foregoing exemplary embodiment of the invention is capable of identifying the position of the pointing means F in a precise manner, so the image sensor 500 according to the present embodiment of the invention is capable of acquiring an image in which the target-image region of the pointing means F can be discriminated from other non-target-image region. Thus, the image sensor 500 according to the present embodiment of the invention can accurately identify a detection target object, offering a significantly enhanced target detection capability.

3: Electronic Apparatus

Next, with reference to FIGS. 20 and 21, an exemplary embodiment of an electronic apparatus that is provided with the liquid crystal device described above is explained below.

Figure 20:
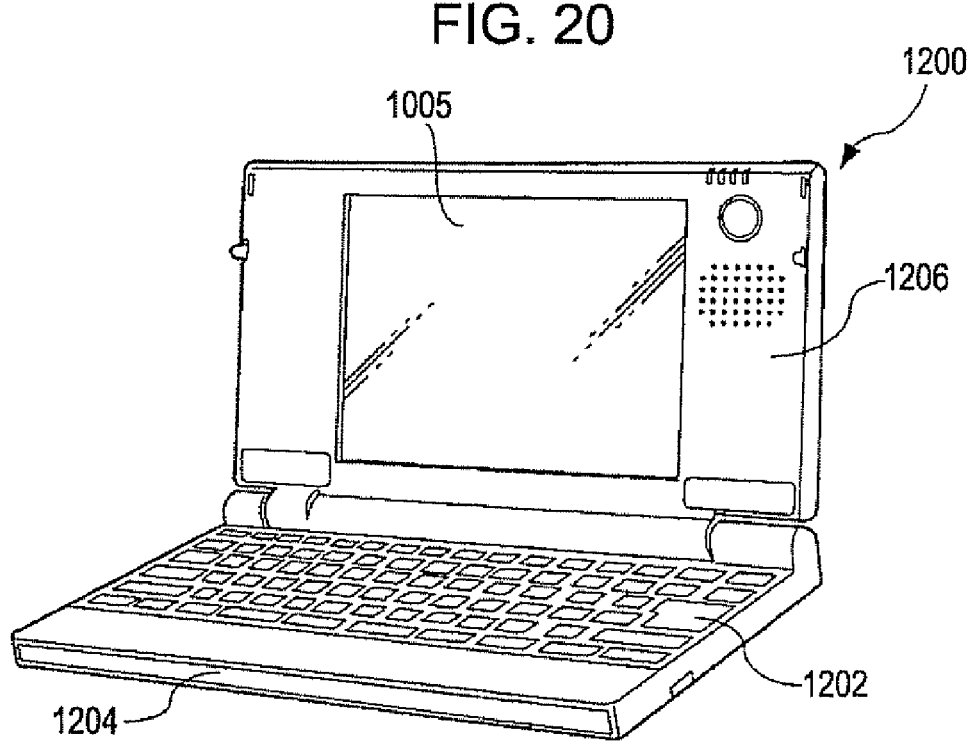
FIG. 20 is a perspective view that schematically illustrates an example of an electronic apparatus according to an exemplary embodiment of the invention.
Figure 21:
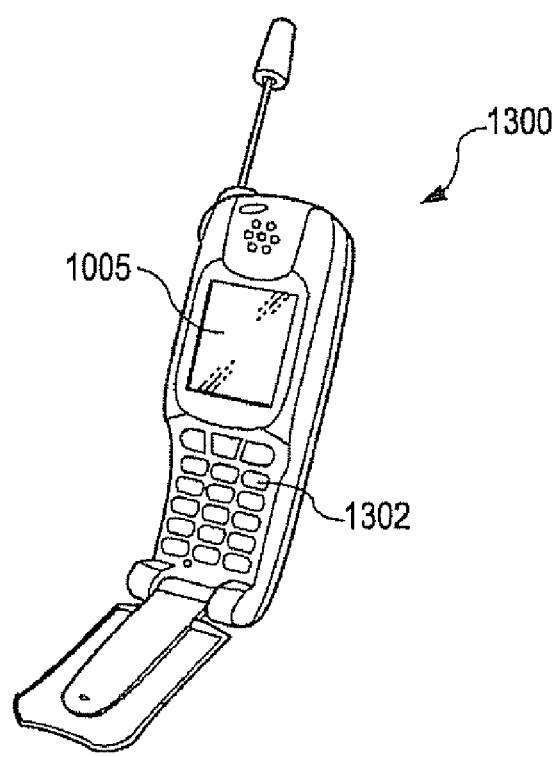
FIG. 21 is a perspective view that schematically illustrates another example of an electronic apparatus according to an exemplary embodiment of the invention.

FIG. 20 is a perspective view that schematically illustrates an example of a mobile personal computer to which the liquid crystal device described above is applied. As illustrated in FIG. 20, a personal computer 1200 is made up of a computer main assembly 1204, which is provided with a keyboard 1202, and a liquid crystal display unit 1206 to which the above-described liquid crystal device is applied. The liquid crystal display unit 1206 is mainly made up of a liquid crystal panel 1005 and a backlight. The backlight is provided on the rear face of the liquid crystal panel 1005. The liquid crystal device according to the foregoing exemplary embodiment of the invention makes it possible to offer a touch-panel function that allows a user to input a variety of kinds of information in a reliable manner even under optically variable ambient conditions.

Next, an explanation is given below of another exemplary implementation of the invention where the liquid crystal device described above is applied to a mobile phone. FIG. 21 is a perspective view that schematically illustrates a mobile phone, which is an example of an electronic apparatus according to the present embodiment of the invention. As illustrated in FIG. 21, a mobile phone 1300 is provided with a reflective-type liquid crystal device 1005, which has the same configuration as that of the liquid crystal device described above, together with a plurality of manual operation buttons 1302. The mobile phone 1300 offers enhanced image display quality. In addition, a user can input information into the mobile phone 1300 with a high precision by, for example, touching the display surface thereof with a finger, which is a non-limiting example of various kinds of pointing means.

What is claimed is:

1. A liquid crystal device comprising:
a first substrate;
a second substrate that is provided over the first substrate in such a manner that the first substrate and the second substrate face each other;
a plurality of optical sensing sections that is formed in an image display area over the first substrate;
a plurality of active incident light adjusting sections that is formed in the image display area in such a manner that each of the plurality of active incident light adjusting sections includes a liquid crystal portion that overlaps the corresponding optical sensing section in a plan view, constituting a part of a liquid crystal layer that is sandwiched between the first substrate and the second substrate, the plurality of active incident light adjusting sections being capable of dynamically adjusting, independently of one another, an amount of incident light that enters the plurality of optical sensing sections through an image display surface that lies at one of two surfaces of the second substrate that does not face the liquid crystal layer, the image display surface being pointed to by a pointing means; and
a controlling section that commands, in a case where it is not possible to discriminate a target-image region of the pointing means from other non-target-image region, and thus, in a case where it is not possible to identify the pointing means in an acquired image, which is obtained as a result of the sensed incident light performed by each of the plurality of the optical sensing sections, one group of the active incident light adjusting sections that corresponds to a white image region contained in the acquired image to increase an incident-light reduction amount, whereas the controlling section commands the other group of the active incident light adjusting sections that corresponds to a black image region contained in the acquired image to decrease the incident-light reduction amount, thereby controlling the plurality of active incident light adjusting sections independently of one another.

2. The liquid crystal device according to claim 1, wherein each of the plurality of active incident light adjusting sections has a liquid crystal element, the liquid crystal element having the liquid crystal portion as well as a first electrode and a second electrode that, in combination with each other, control the liquid crystal portion; and
each of the plurality of active incident light adjusting sections further has a first polarizing layer that is formed between the optical sensing section and the liquid crystal layer over the first substrate and a second polarizing layer that is formed at a second-substrate side when viewed from the liquid crystal layer.

3. The liquid crystal device according to claim 2, further comprising:
a plurality of pixel electrodes each of which is provided in the corresponding one of a plurality of pixel units that make up the image display area over the first substrate, wherein the first electrode of the liquid crystal element is formed in the same layer as that of the pixel electrodes.

4. The liquid crystal device according to claim 3, wherein each of the first polarizing layer and the second polarizing layer extends so as to overlap the pixel electrodes in a plan view.

5. The liquid crystal device according to claim 4, further comprising a third polarizing layer that has an optical axis extending along the optical axis of the first polarizing layer, the third polarizing layer being provided at a first-substrate side when viewed from the optical sensing sections, and the third polarizing layer extending so as to overlap the pixel electrodes in a plan view.

6. An image sensor comprising:
a substrate;
a plurality of optical sensing sections that is formed in an image detection area over the substrate, the plurality of optical sensing sections being configured to detect a pointing means that overlaps with a portion of the image detection area; and
plurality of active incident light adjusting sections that is formed in the image detection area over the substrate, the plurality of active incident light adjusting sections being capable of dynamically adjusting, independently of one another, an amount of incident light that enters the plurality of optical sensing sections,
wherein in a case where it is not possible to discriminate a target-image region of the pointing means from other non-target-image region, and thus, in a case where it is not possible to identify the pointing means in an acquired image, which is obtained as a result of the sensed incident light performed by each of the plurality of the optical sensing sections, one group of the active incident light adjusting sections that corresponds to a white image region contained in the acquired image responds to a command to increase an incident-light reduction amount, whereas the other group of the active incident light adjusting sections that corresponds to a black image region contained in the acquired image responds to a command to decrease the incident-light reduction amount, such that the plurality of active incident light adjusting sections are controlled independently of one another.

7. An electronic apparatus that is provided with the liquid crystal device according to claim 1.

* * * * *